(12) United States Patent
Yamamoto et al.

(10) Patent No.: US 8,766,766 B2
(45) Date of Patent: Jul. 1, 2014

(54) INFORMATION PROCESSING APPARATUS, INFORMATION PROCESSING SYSTEM, INFORMATION PROCESSING METHOD, AND PROGRAM

(75) Inventors: Kazuyuki Yamamoto, Kanagawa (JP); Shunichi Kasahara, Kanagawa (JP); Ken Miyashita, Tokyo (JP); Ikuo Yamano, Tokyo (JP); Hiroyuki Mizunuma, Tokyo (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 13/206,688

(22) Filed: Aug. 10, 2011

(65) Prior Publication Data
US 2012/0068812 A1 Mar. 22, 2012

(30) Foreign Application Priority Data

Sep. 17, 2010 (JP) ................ P2010-209339

(51) Int. Cl.
*G05B 19/00* (2006.01)
*G08B 1/08* (2006.01)
*G06K 7/00* (2006.01)
*H04N 5/222* (2006.01)
*G06Q 30/00* (2012.01)

(52) U.S. Cl.
USPC .......... 340/5.1; 340/5.8; 340/539.1; 382/312; 348/333.1; 705/26

(58) Field of Classification Search
USPC .............. 340/5.1, 5.8, 539.1; 382/312; 348/333.1; 705/26
See application file for complete search history.

(56) References Cited

U.S. PATENT DOCUMENTS

| | | | | | |
|---|---|---|---|---|---|
| 6,005,547 | A | * | 12/1999 | Newman et al. | 345/156 |
| 6,710,754 | B2 | * | 3/2004 | Hanson et al. | 345/2.1 |
| 7,738,025 | B2 | * | 6/2010 | Nonaka | 348/333.13 |
| 8,384,660 | B2 | * | 2/2013 | Ichieda | 345/156 |
| 2002/0114626 | A1 | * | 8/2002 | Fukui et al. | 396/429 |
| 2005/0078879 | A1 | * | 4/2005 | Sakurai et al. | 382/275 |
| 2006/0230192 | A1 | * | 10/2006 | Parry et al. | 710/15 |
| 2010/0123545 | A1 | * | 5/2010 | Ozawa | 340/5.8 |

FOREIGN PATENT DOCUMENTS

JP 11-053111 2/1999

* cited by examiner

*Primary Examiner* — Jennifer Mehmood
*Assistant Examiner* — Omar Casillashernandez
(74) *Attorney, Agent, or Firm* — Finnegan, Henderson, Farabow, Garrett & Dunner, L.L.P.

(57) ABSTRACT

There is provided an information processing apparatus including a projection control section configured to control projection of a projection image containing first information for authentication onto a second information processing apparatus placed within a projection region, an authentication control section configured to control an authentication process with the second information processing apparatus using second information for authentication detected based on a picked-up image of the projection region, and a communication control section configured to control communication with a second information processing apparatus authenticated by the authentication control section.

20 Claims, 24 Drawing Sheets

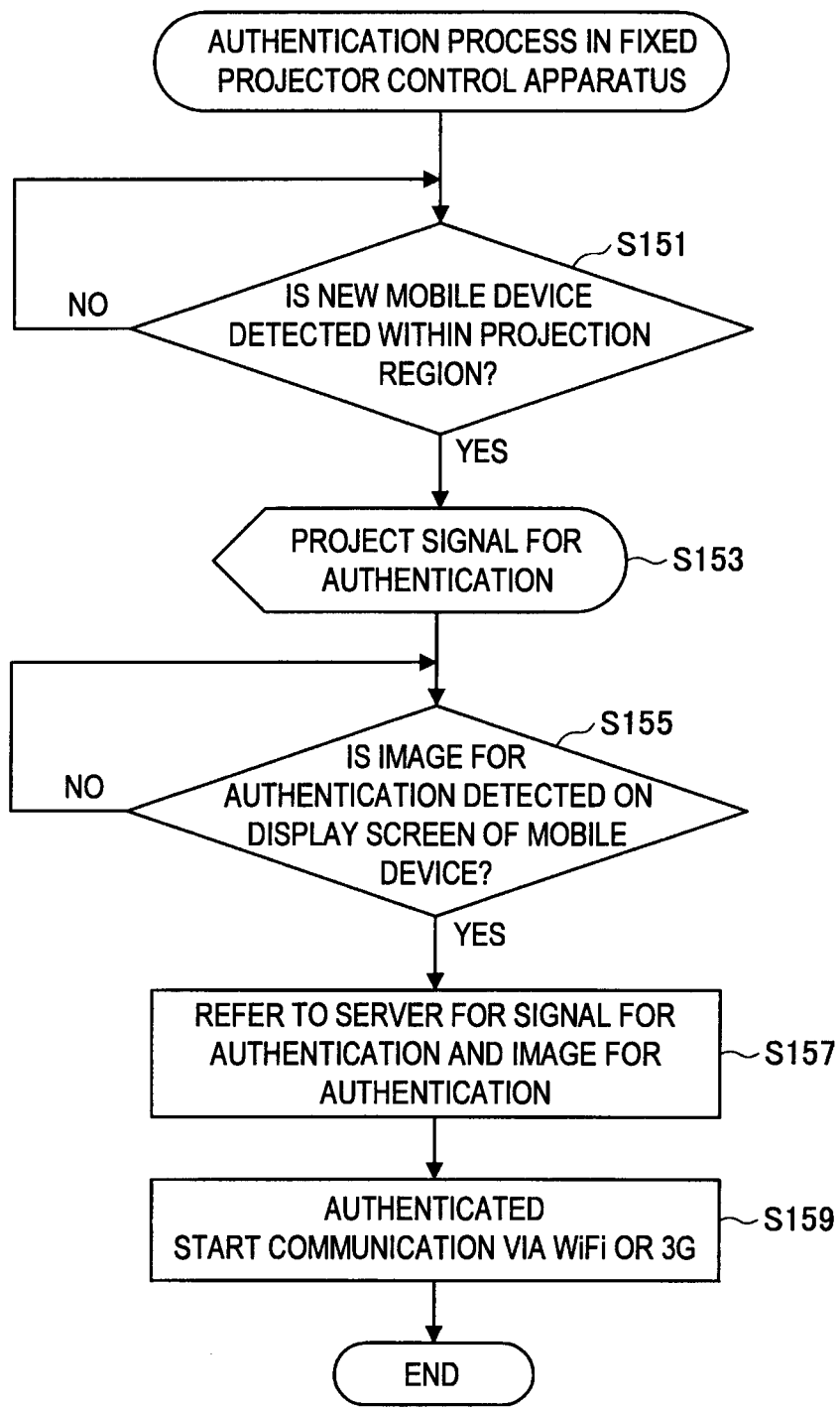

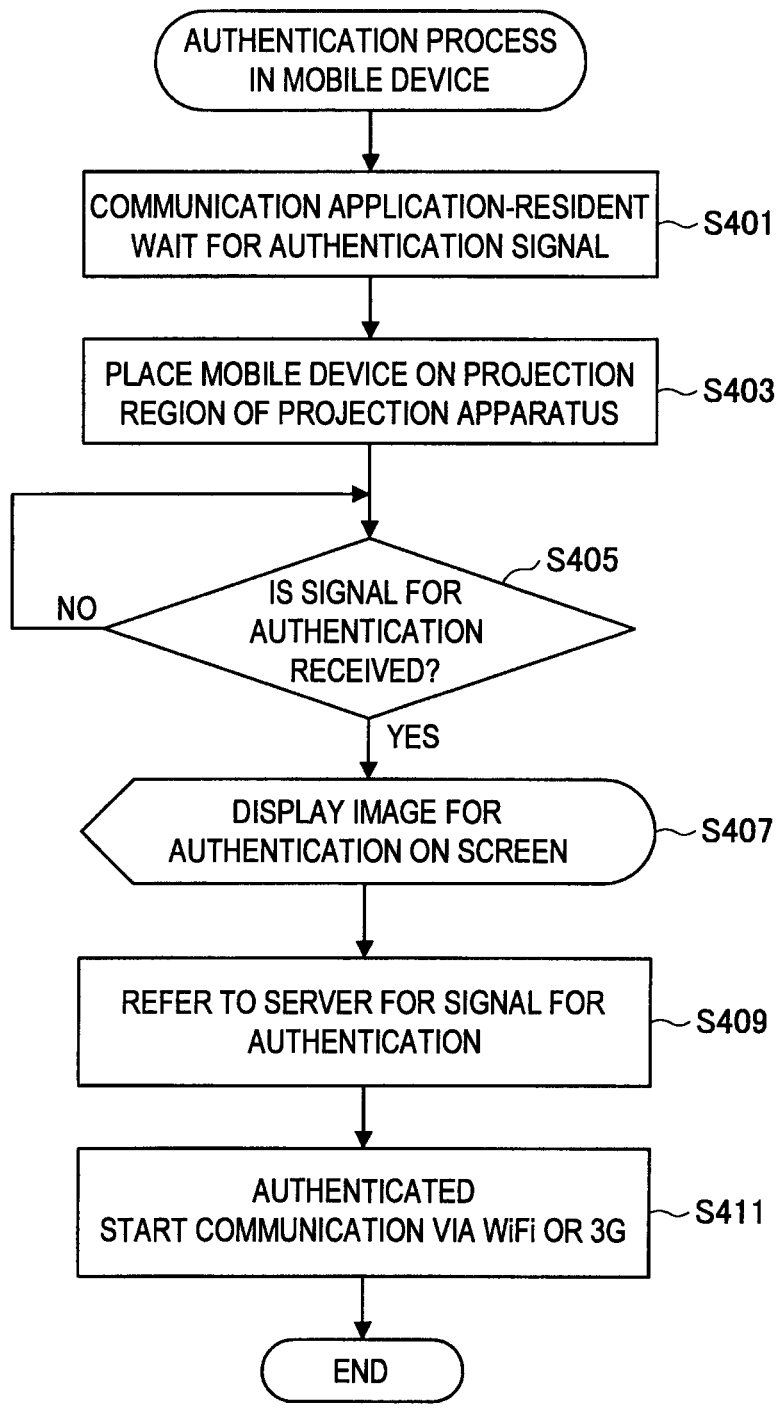

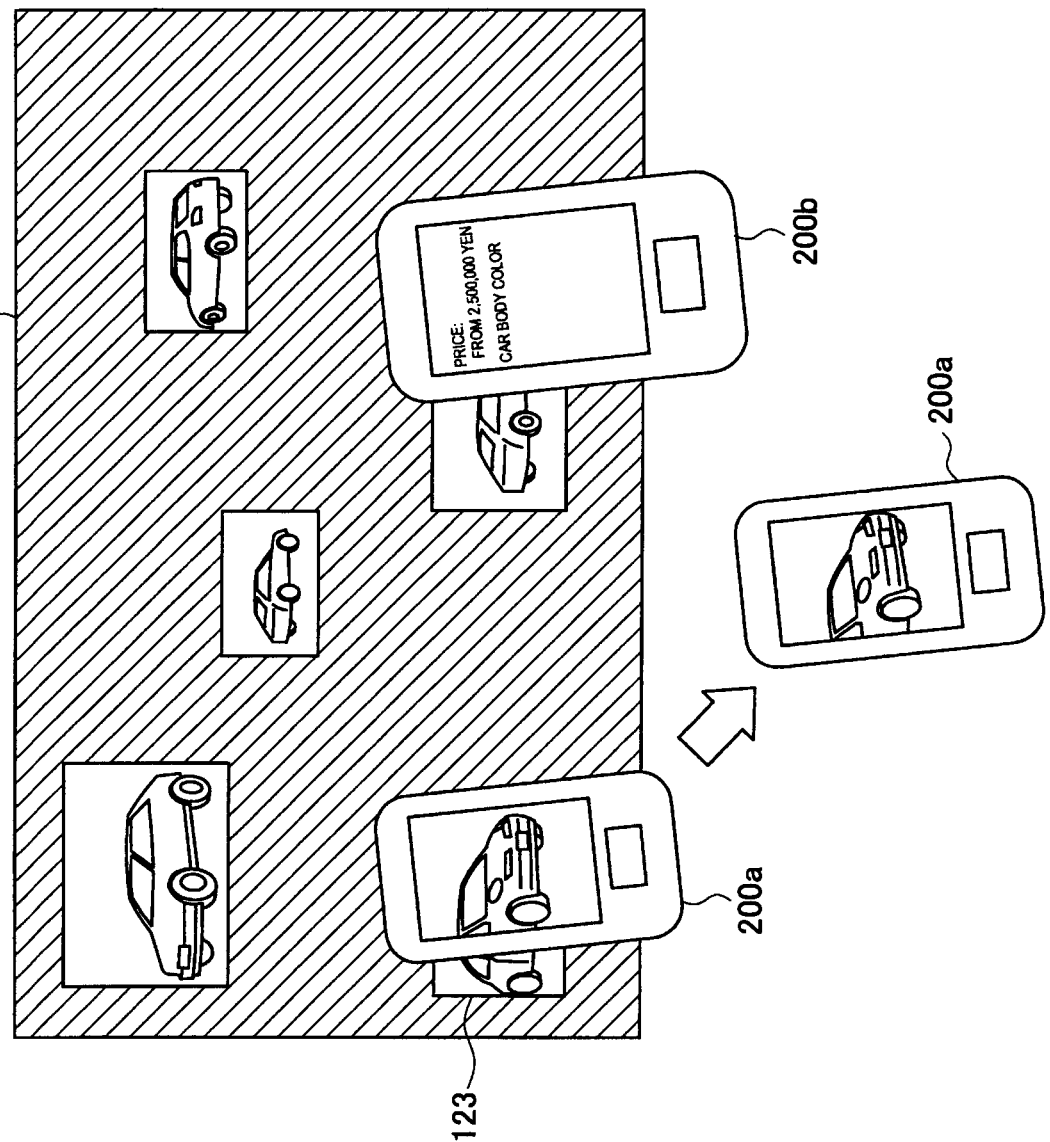

INFORMATION PROCESSING APPARATUS, INFORMATION PROCESSING SYSTEM, INFORMATION PROCESSING METHOD, AND PROGRAM

BACKGROUND

The present disclosure relates to an information processing apparatus, an information processing system, an information processing method, and a program. In particular, the present disclosure relates to an information processing apparatus, an information processing system, an information processing method, and a program which are capable of easily and reliably performing authentication and information communication between a plurality of devices.

In recent years, devices each having a function of connecting to a network have been spread rapidly. Accordingly, a user has a greater opportunity to exchange information between devices. In the case of exchanging information between the devices, there are used a method of connecting the devices through wire, a method of causing the devices to perform transmission/reception by placing infrared transmission/reception sections face to face, and the like (for example, refer to JP H11-053111A).

However, in the case of the connection through wire, it was necessary to prepare a cable and the like, which was complicated. Further, as for the infrared communication, it was necessary to place the infrared transmission/reception sections face to face and it was difficult to handle high-capacity data, and hence, information to be exchanged was limited.

SUMMARY

Consequently, it is considered that radio communication such as WiFi (Wireless Fidelity) is used. However, in this case, it was necessary to input each other's specific number for the purpose of device authentication. Therefore, there was an issue that the procedure was complicated and necessitated a technical knowledge. In particular, in the case of temporarily attempting communication with another apparatus, an easier method was desired.

In light of the foregoing, it is desirable to provide an information processing apparatus, an information processing system, an information processing method, and a program, which are novel and improved, and which are capable of easily performing transmission/reception of data between a plurality of devices.

According to an embodiment of the present disclosure, there is provided an information processing apparatus which includes a projection control section configured to control projection of a projection image containing first information for authentication onto a second information processing apparatus placed within a projection region, an authentication control section configured to control an authentication process with the second information processing apparatus using second information for authentication detected based on a picked-up image of the projection region, and a communication control section configured to control communication with a second information processing apparatus authenticated by the authentication control section.

According to such a configuration, in the information processing apparatus and the second information processing apparatus, the first information for authentication is provided from the information processing apparatus to the second information processing apparatus using a projection apparatus, and the second information for authentication provided from the second information processing apparatus to the information processing apparatus can be detected from the picked-up image. Then, the information processing apparatus becomes capable of performing the authentication process based on the second information for authentication. Since the projection image containing the first information for authentication is projected on a region including an imaging section of the second information processing apparatus, the second information processing apparatus can detect the first information for authentication based on the picked-up image using the imaging section. Since the communication control section communicates with the authenticated second information processing apparatus, it becomes possible to perform exchange of data between the apparatuses.

The projection control section may cause a projection image containing a light-emission pattern associated with the first information for authentication to be projected.

The information processing apparatus may further include a detection section configured to detect the second information for authentication based on the picked-up image. The authentication control section may perform an authentication process based on the second information for authentication detected by the detection section.

The detection section may detect the second information for authentication from an image for authentication displayed on a display screen of the second information processing apparatus, the image for authentication being included in the picked-up image.

When it is detected that the second information processing apparatus is placed within the projection region, the projection control section may cause the projection image containing the first information for authentication to be projected.

When the second information for authentication provided from the second information processing apparatus is detected, the projection control section may cause the projection image containing the first information for authentication to be projected.

The information processing apparatus may further include a storage section configured to store content. The projection control section may cause a projection image containing an object image associated with content stored in the storage section to be projected. When the second information processing apparatus on the object image is detected, the communication control section may cause content associated with the object image to be transmitted to the second information processing apparatus on the object image.

The information processing apparatus may further include a detection section configured to detect a change in a distance between an imaging apparatus which captures the picked-up image and the second information processing apparatus, based on the picked-up image.

The object image may be associated with a plurality of pieces of content. The communication control section may cause content selected based on the distance between the imaging apparatus and the second information processing apparatus, which is detected by the detection section, to be transmitted to the second information processing apparatus.

The detection section may detect the change in the distance based on a change in a size of a predetermined part of the second information processing apparatus in the picked-up image.

The information processing apparatus may further include a detection section configured to detect an orientation of the second information processing apparatus based on the picked-up image.

The detection section may detect, based on the change in the orientation of second information processing apparatus, a rotation operation of the second information processing apparatus. When the rotation operation of the second information processing apparatus on an object image within a projection image is detected, the projection control section may cause a position of the object image to be changed based on a position of the second information processing apparatus in which the rotation operation is detected.

The detection section may detect the orientation of the second information processing apparatus further based on learning data related to an external appearance of the second information processing apparatus.

The detection section may detect a symbol from a part of the second information processing apparatus within the picked-up image, and may detect the orientation of the second information processing apparatus based on an orientation of the symbol.

The information processing apparatus may further include a detection section configured to detect a position of the second information processing apparatus based on the picked-up image. The communication control section may cause content displayed on a display section of the authenticated second information processing apparatus to be acquired. The projection control section may control projection of a projection image containing an object image indicating that the acquired content at a position at which the second information processing apparatus is detected.

The projection control section may select a light-emission pattern to be used for authentication from among a plurality of kinds of the light-emission patterns, and, when there are a plurality of information processing apparatuses within the projection regions, may cause light-emission patterns which are different from each other to be projected onto respective information processing apparatuses.

When, after the second information processing apparatus was detected, the second information processing apparatus becomes undetected within the projection region, the communication control section may cut off communication with the second information processing apparatus.

The projection control section may control projection of a projection image containing an authenticated image indicating that authentication of the second information processing apparatus authenticated by the authentication control section is completed.

According to another embodiment of the present disclosure, there is provided an information processing system including a first information processing apparatus which controls a projection section, and a second information processing apparatus which is placed within a projection region of the projection section. The first information processing apparatus includes a projection control section configured to control projection of a projection image containing first information for authentication onto the second information processing apparatus, an authentication control section configured to control an authentication process with the second information processing apparatus using second information for authentication detected based on a picked-up image of the projection region, and a communication control section configured to control communication with the second information processing apparatus authenticated by the authentication control section. The second information processing apparatus includes an imaging section configured to acquire the projection image, an authentication control section configured to control an authentication process with the first information processing apparatus using the first information for authentication detected from the projection image, and a communication control section configured to control communication with the authenticated first information processing apparatus.

According to another embodiment of the present disclosure, there is provided an information processing method which includes detecting a second information processing apparatus placed within a projection region, projecting a projection image containing first information for authentication onto the second information processing apparatus, detecting second information for authentication based on a picked-up image of the projection region, performing an authentication process with the second information processing apparatus using the detected second information for authentication, and starting communication with the authenticated second information processing apparatus.

According to another embodiment of the present disclosure, there is provided a program for causing a computer to function as an information processing apparatus which includes a projection control section configured to control projection of a projection image containing first information for authentication onto a second information processing apparatus placed within a projection region, an authentication control section configured to control an authentication process with the second information processing apparatus using second information for authentication detected based on a picked-up image of the projection region, and a communication control section configured to control communication with a second information processing apparatus authenticated by the authentication control section.

According to the embodiments of the present disclosure described above, there can be provided the information processing apparatus, the information processing system, the information processing method, and the program, which are novel and improved, and which are capable of easily performing transmission/reception of data between a plurality of devices.

BRIEF DESCRIPTION OF THE DRAWINGS

FIG. 4B is a flowchart showing an operation performed in the fixed projector control apparatus in the first example of the authentication process between devices;

FIG. 9A is a flowchart showing an operation performed in the mobile device in a fourth example of the authentication process between devices;

FIG. 11 is an explanatory diagram illustrating an operation in a first example of a service which can be realized by the information processing system according to the embodiment;

DETAILED DESCRIPTION OF THE EMBODIMENT(S)

Figure 1:
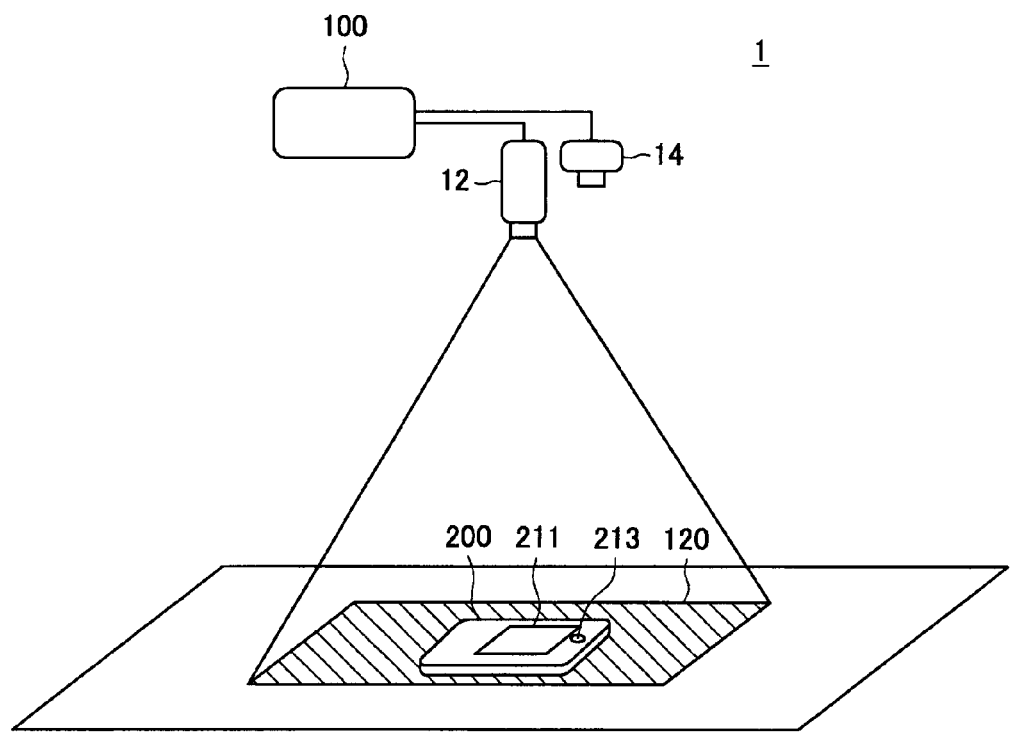
FIG. 1 is a system configuration diagram of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First Embodiment
   1-1. Configuration
   1-2. Authentication process
   1-3. Interaction
2. Second Embodiment
   2-1. Configuration
   2-2. Operation
3. Summary Note that, in this specification and the appended drawings, there are some cases where a plurality of structural elements that have substantially the same function and structure are distinguished from one another by being denoted with different alphabets after the same reference numerals. For example, a plurality of structural elements that have substantially the same function and structure are distinguished from one another as necessary, like a mobile device 200a and a mobile device 200b. Note that, in the case where it is not necessary to distinguish the plurality of structural elements that have substantially the same function and structure from one another, the plurality of structural elements are denoted with the same reference numeral only. For example, in the case where it is not particularly necessary to distinguish the mobile device 200a, the mobile device 200b, and the like from one another, they are each simply referred to as mobile device 200.

1. First Embodiment

[1-1. Configuration]
(Configuration of System)

Figure 2:
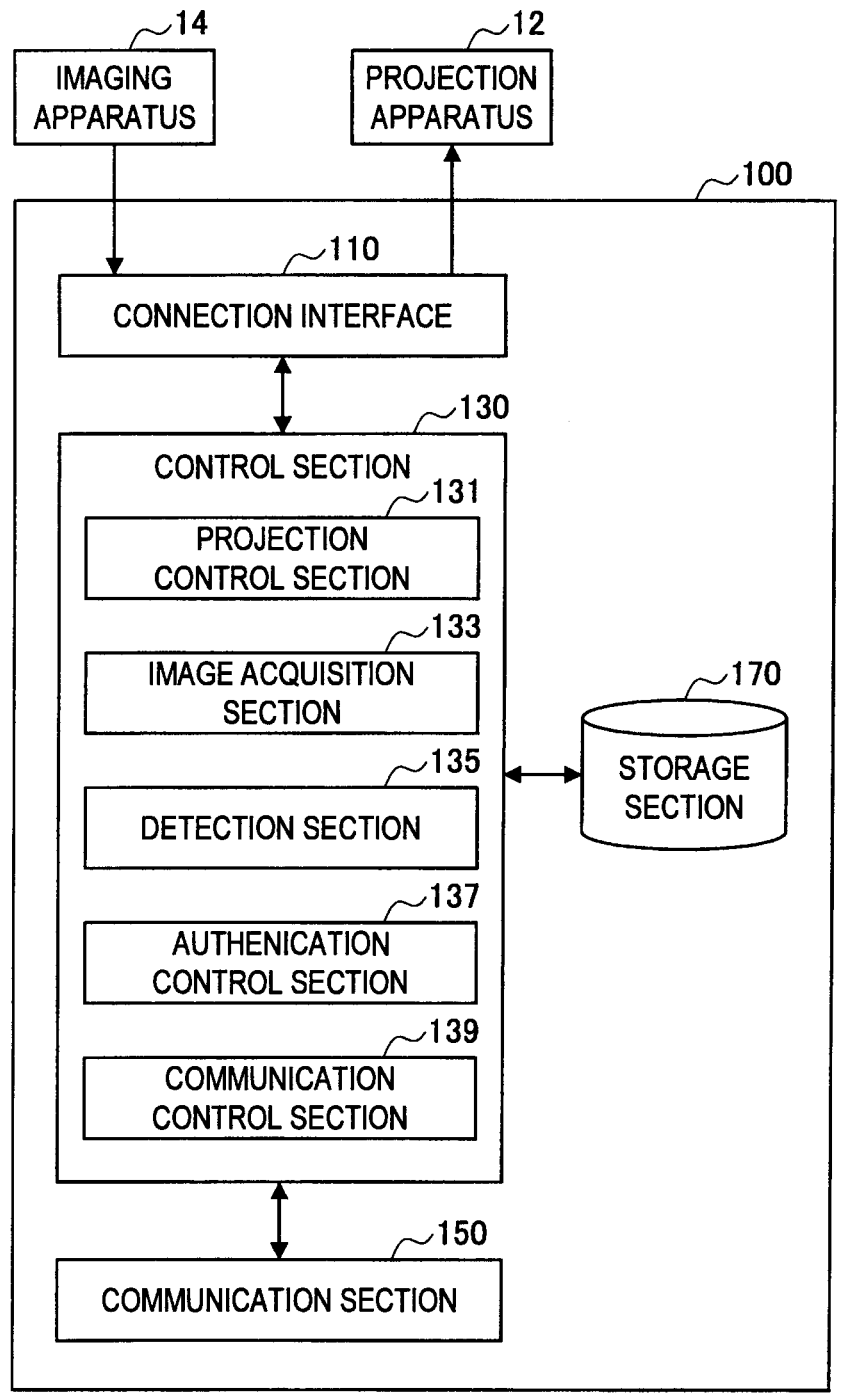
FIG. 2 is a block diagram showing a configuration of a fixed projector control apparatus according to the embodiment.
Figure 3:
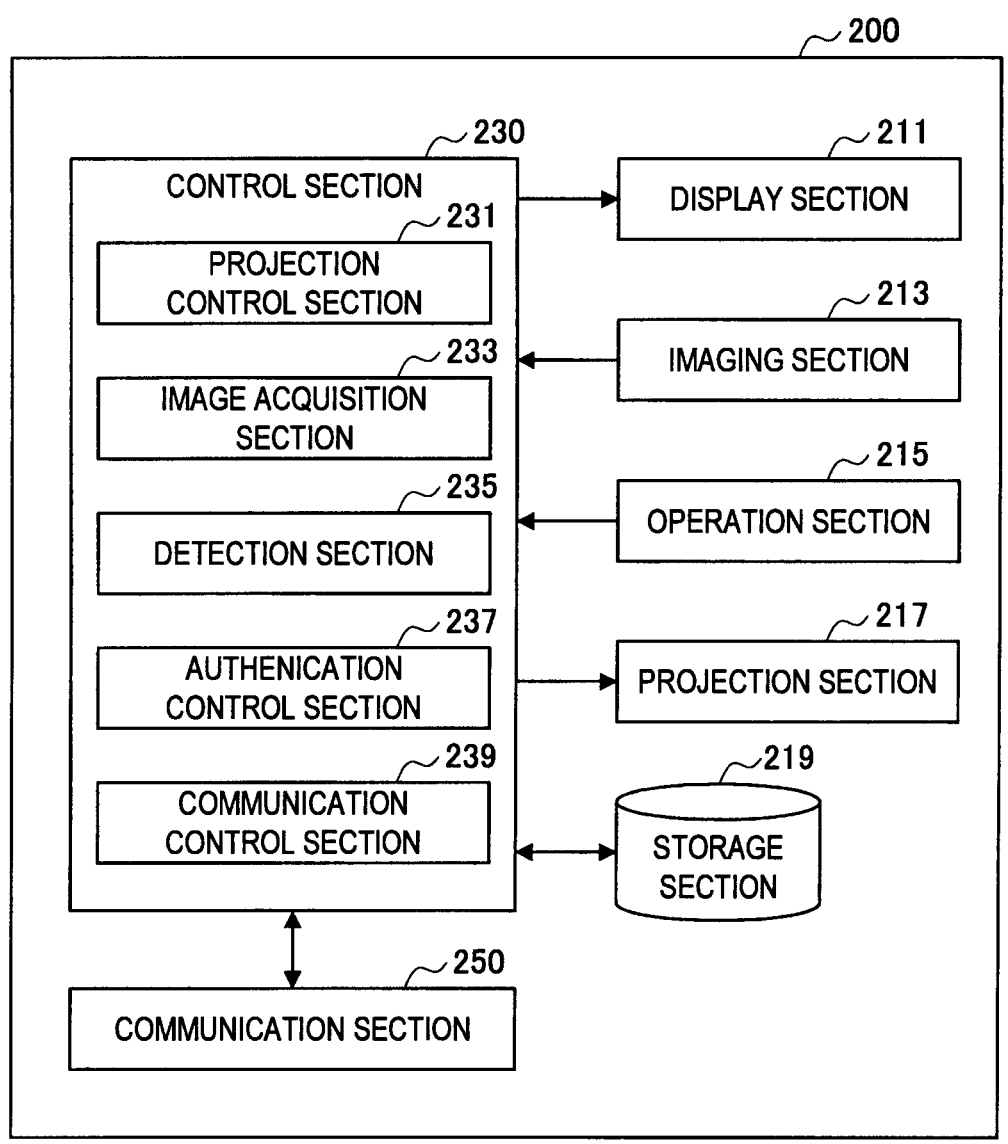
FIG. 3 is a block diagram showing a configuration of a mobile device according to the embodiment.

First, with reference to FIGS. 1 to 3, there will be described a configuration of an information processing system according to a first embodiment of the present disclosure. FIG. 1 is a system configuration diagram of the information processing system according to the first embodiment of the present disclosure. Further, FIG. 2 is a block diagram showing a configuration of a fixed projector control apparatus according to the embodiment. FIG. 3 is a block diagram showing a configuration of a mobile device according to the embodiment.

Referring to FIG. 1, an information processing system 1 according to the present embodiment includes a fixed projector control apparatus 100 which controls a projection apparatus 12 and an imaging apparatus 14, and a mobile device 200 which is present within a projection region of the projection apparatus 12.

The projection apparatus 12 has a function of projecting a projection image in accordance with the control of the fixed projector control apparatus 100. Here, a region on which the projection image is projected is called projection region. The projection region is a three-dimensional region including a projection area 120, and includes space in which the projection image is projected between the projection area 120 and the projection apparatus 12. In the present embodiment, the projection apparatus 12 is a fixed-type projector apparatus, and is a front projector. Further, the projection apparatus 12 is provided on a ceiling, for example, and projects the projection image onto a floor. Alternatively, the projection apparatus 12 may project the projection image onto a ceiling or a wall. In the case of using the front projector, since the facilities such as the floor, the ceiling, and the wall can be used as they are as the projection areas, there is an advantage in that existing facilities can be used.

The imaging apparatus 14 has a function of imaging the projection region of the projection apparatus 12 in accordance with the control of the fixed projector control apparatus 100. In the present embodiment, the projection region is identical to an imaging range of the imaging apparatus 14, and is hereinafter used synonymously with an imaging region. The imaging apparatus 14 outputs an acquired picked-up image to the fixed projector control apparatus 100.

The fixed projector control apparatus 100 has a function of controlling the projection apparatus 12 and the imaging apparatus 14, and is an example of a second information processing apparatus. The fixed projector control apparatus 100 has a function of detecting the mobile device 200 which is present within the projection region, based on the picked-up image acquired by the imaging apparatus 14. Then, the fixed projector control apparatus 100 performs an authentication process with the detected mobile device 200, and establishes a connection with the authenticated mobile device 200. In this case, in order that the user can easily perform the authentication process, the fixed projector control apparatus 100 uses a signal for authentication, which is to be projected by the projection apparatus 12, and an image for authentication on a display screen of the mobile device 200, which is acquired by the imaging apparatus 14. Here, the signal for authentication is a light-emission pattern associated with information of a device-specific number of the fixed projector control apparatus 100, for example. Further, the image for authentication is an image associated with information of a device-specific number of the mobile device 200. Note that the device-specific number of the fixed projector control apparatus 100 is an example of first information for authentication, and the device-specific number of the mobile device 200 is an example of second information for authentication. More details on the authentication process will be described below.

The mobile device 200 has a communication function, and is an example of the second information processing apparatus which communicates with the fixed projector control apparatus 100. The mobile device 200 may be a mobile phone. The mobile device 200 has a display section 211 and an imaging section 213, and it is preferred that the display section 211 and the imaging section 213 be placed on the same surface of the casing of the mobile device 200. According to such a configuration, when the mobile device 200 is placed on the projection area 120, the following arrangement can be realized: the projection apparatus 12 and the imaging section 213 face each other; and the imaging apparatus 14 and the display section 211 face each other. Accordingly, the projection image of the projection apparatus 12 can be acquired by the imaging section 213, and the display screen of the display section 211 can be acquired by the imaging apparatus 14.

In addition, although not shown, the fixed projector control apparatus 100 and the mobile device 200 can be connected to each other via an authentication server and a network. Then, in the authentication process to be described below, the fixed projector control apparatus 100 and the mobile device 200 each transmit the acquired information for authentication to the authentication server, and each acquires an authentication result from the authentication server.

(Configuration of Fixed Projector Control Apparatus 100)

Next, with reference to FIG. 2, there will be described a detailed configuration of the fixed projector control apparatus 100. Referring to FIG. 2, the fixed projector control apparatus 100 mainly includes a connection interface 110, a control section 130, a communication section 150, and a storage section 170.

The connection interface 110 is an interface section for connecting to the projection apparatus 12 and to the imaging apparatus 14. For example, the connection interface 110 may be a connector for the connection through wire, or may be a communication section for connecting to the projection apparatus 12 and to the imaging apparatus 14 via wire or radio communication. In this case, the connection interface 110 may be provided in an integrated manner with the communication section 150.

The control section 130 controls an entire operation of the fixed projector control apparatus 100. The control section 130 mainly functions as a projection control section 131, an image acquisition section 133, a detection section 135, an authentication control section 137, and a communication control section 139.

The projection control section 131 controls projection of a projection image performed by the projection apparatus 12. The projection control section 131 can project a projection image containing an object image indicating content stored in the storage section 170 or content which can be acquired by the fixed projector control apparatus 100 via the communication section 150, for example. When there is an operation to the object image within the projection region, the projection control section 131 can generate and project a projection image in which the operation is reflected.

When the fixed projector control apparatus 100 and the mobile device 200 are authenticated, although the fixed projector control apparatus 100 and the mobile device 200 can exchange information via a communication path, the projection control section 131 generates and projects the projection image in order that the exchange of the information is intuitively easily understandable.

Further, at the time of authentication, the projection control section 131 controls projection of a projection image containing a signal for authentication on a region including the imaging section 213 of the mobile device 200. Specifically, as the signal for authentication, pulsed light emission having a predetermined pattern is used and the pulsed light is projected on the mobile device 200 by the projection apparatus 12. It is preferred that there be a plurality of patterns of signals for authentication, and the projection control section 131 controls projection of a projection image containing a signal for authentication selected randomly or in order from the plurality of patterns of signals for authentication. In this way, with the use of the signal for authentication selected from the plurality of candidates, the degree of security can be enhanced, and authentication processes with respect to a plurality of mobile devices 200 can be performed simultaneously. In this case, the projection control section 131 selects signals for authentication to be used such that signals for authentication which are different from each other are used for the plurality of mobile devices 200 to which authentication processes are performed simultaneously. Here, the signal for authentication includes information for authentication such as a specific number used for authentication, for example.

The image acquisition section 133 has a function of acquiring a picked-up image of the projection region, by controlling the imaging apparatus 14. The image acquisition section 133 may acquire the picked-up image regularly from the imaging apparatus 14, for example.

The detection section 135 has a function of detecting a change in a state within the projection region based on the picked-up image acquired by the image acquisition section 133. The detection section 135 can detect presence and a position of the mobile device 200. Further, the detection section 135 can detect a symbol or an image drawn on the casing or the display screen of the mobile device 200. Specifically, the detection section 135 can also detect the image for authentication displayed on the display screen of the mobile device 200 at the time of authentication. Further, with the image acquisition section 133 continuously acquiring picked-up images from the imaging apparatus 14 and analyzing the acquired picked-up images, the detection section 135 can detect a change in a position of the mobile device 200 within the projection region.

Further, the detection section 135 can also detect an orientation of the mobile device 200. For example, by analyzing the picked-up image, the detection section 135 can estimate the orientation of the mobile device 200 based on an orientation of a symbol such as letters and figures printed on the casing of the mobile device 200. Alternatively, by referring to learning data related to an external appearance of the mobile device 200 which is acquired beforehand, the detection section 135 can detect the orientation of the mobile device 200. Further, in order to detect the orientation, there may be displayed a specific pattern on the display screen of the mobile device 200 while the fixed projector control apparatus 100 and the mobile device 200 are connected to each other, and the orientation of the mobile device 200 may be detected by detecting the display pattern from the picked-up image. Here, it is desirable that the display pattern is an asymmetrical shape such that the orientation is detected easily, and is a simple shape in order that the display pattern is detected easily from the picked-up image. Further, in order to avoid erroneous detection, it is desirable that the display pattern is a peculiar shape that is usually not seen in everyday life. Note that the display pattern is displayed on a part of or all over the display screen, and may be displayed continuously or periodically. In addition, the display pattern may be a still image or a moving image.

Further, the detection section 135 can also detect a change in a distance between the imaging apparatus 14 and the mobile device 200. The detection section 135 may detect the change in the distance between the imaging apparatus 14 and the mobile device 200 based on, for example, a change in the size of the outer frame of the mobile device 200, the size of the display screen, or the size of a specific pattern displayed on the display screen. Alternatively, in the case where the imaging apparatus 14 is an imaging apparatus for acquiring depth, the detection section 135 may detect the change in the distance between the imaging apparatus 14 and the mobile device 200 by acquiring information of the distance along with the picked-up image. Further, the detection section 135 may detect the change in the distance between the imaging apparatus 14 and the mobile device 200 by detecting a change in the intensity of light reflected from the mobile device 200.

The authentication control section 137 has a function of controlling the authentication process based on the signal for authentication contained in the projection image projected by the projection control section 131 and the image for authentication displayed on the display screen of the mobile device 200 detected by the detection section 135. For example, the authentication control section 137 can transmit the information for authentication to an external authentication server, and can acquire an authentication result. The detail of the authentication process will be described below using flowcharts.

The communication control section 139 has a function of communicating with an external device by controlling the communication section 150. The communication control section 139 establishes communication with a mobile device 200 authenticated by the authentication control section 137. Further, when there is detected a communication cut-off trigger, the communication control section 139 cuts off the communication with mobile device 200. For example, the communication cut-off trigger may represent a fact that the mobile device 200 once detected by the detection section 135 is detected to be outside the projection region. Further, although not shown, the communication cut-off trigger may represent time at which a user operates operation means, the operation means being a button or the like provided to the fixed projector control apparatus 100 for indicating communication termination. Alternatively, the communication cut-off trigger may represent a fact that the termination of the communication application in the mobile device 200 is detected.

The communication section 150 is a communication interface configured from a communication device for connecting to an external device and the like. For example, in the case where the communication section 150 performs radio communication, the communication section 150 may include a communication antenna for transmitting/receiving a signal for communication, and a processing circuit for performing various signal processes for communication. Further, the communication section 150 may be a communication interface for wire communication. The data held by the communication section 150 and the data held by the authenticated mobile device 200 can be transmitted/received between the communication section 150 and the authenticated mobile device 200.

The storage section 170 has a function of storing various data used in the fixed projector control apparatus 100. The storage section 170 can include a storage medium, a recording device for recording data in the storage medium, a reading device for reading out the data from the storage medium, and a deletion device for deleting the data stored in the storage medium. Examples of the storage medium used here include a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 170 stores a program executed by the control section 130, content to be transmitted to the mobile device 200, and the like.

Heretofore, one of the examples of the functions of the fixed projector control apparatus 100 according to the present embodiment has been shown. Each of the above components may be configured using general-purpose members or circuits, or may be configured using hardware specialized for the function of each component. Further, the function of each component may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the fixed projector control apparatus 100 according to the present embodiment as described above, and the computer program can be implemented in a personal computer or the like. Further, there can also be provided a computer-readable recording medium in which the computer program is stored. Examples of the recording medium include a magnetic disk, an optical disk, a magneto-optical disk, and a flash memory. Further, the computer program may be distributed via a network without using the recording medium, for example.

(Configuration of Mobile Device 200)

Next, with reference to FIG. 3, there will be described a detailed configuration of the mobile device 200. Referring to FIG. 3, the mobile device 200 mainly includes a display section 211, an imaging section 213, an operation section 215, a projection section 217, a storage section 219, a control section 230, and a communication section 250.

The display section 211 has a function of outputting information to a user in accordance with the control of the control section 230. The information to be output is provided to the user in a form of a display screen or audio, for example. The display section 211 is configured from, for example, display devices such as a liquid crystal display (LCD) device, an OLED (Organic Light Emitting Diode) device, a CRT (Cathode Ray Tube) display device, and a lamp.

The imaging section 213 is configured from a lens for acquiring an image and an image sensor such as CCD or CMOS, and has a function of outputting a captured image to the control section 230. The imaging section 213 is placed on the same surface of a casing of the mobile device 200 as the display section 211.

The operation section 215 has a function for inputting various types of information to the mobile device 200 by being operated by the user. For example, the operation section 215 is configured from input means for inputting information by a user, such as a touch panel, a mouse, a keyboard, a button, a microphone, a switch, and a lever, and an input control circuit which generates an input signal based on the input by the user and outputs the generated input signal to the control section 230.

The projection section 217 is configured from a projector for projecting a projection image. The projection section 217 projects the projection image in accordance with the control of the projection control section 231.

The storage section 219 has a function of storing various data used in the mobile device 200. The storage section 219 can include a storage medium, a recording device for recording data in the storage medium, a reading device for reading out the data from the storage medium, and a deletion device for deleting the data stored in the storage medium. Examples of the storage medium used here include a non-volatile memory such as a flash memory, an EEPROM (Electronically Erasable and Programmable Read Only Memory), an MRAM (Magnetoresistive Random Access Memory), a FeRAM (Ferroelectric Random Access Memory), and a PRAM (Phase change Random Access Memory), and a magnetic recording medium such as an HDD (Hard Disk Drive). In the present embodiment, the storage section 219 stores a program executed by the control section 230, content to be transmitted to the fixed projector control apparatus 100, and the like.

The control section 230 mainly functions as a projection control section 231, an image acquisition section 233, a detection section 235, an authentication control section 237, and a communication control section 239. The projection control section 231 controls the projection of the projection image performed by the projection section 217.

The image acquisition section 233 has a function of acquiring a picked-up image by controlling the imaging section 213. The image acquisition section 233 acquires a picked-up image containing a signal for authentication projected from the projection apparatus 12 by the control of the fixed projector control apparatus 100, and outputs the picked-up image to the detection section 235.

The detection section 235 has a function of detecting a change in a state within the imaging region of the imaging section 213 based on the picked-up image acquired by the image acquisition section 233. The detection section 235 can detect the signal for authentication projected from the projection apparatus 12 by the control of the fixed projector control apparatus 100, based on the picked-up image, for example.

The authentication control section 237 has a function of controlling the authentication process with the apparatus with which the mobile device 200 is in communication. In the present embodiment, the authentication control section 237 controls the authentication process with the fixed projector control apparatus 100. When an authentication process-start trigger is detected, the authentication control section 237 causes the display section 211 to display an image for authentication. After that, when the detection section 235 detects the signal for authentication from the fixed projector control apparatus 100, authentication control section 237 transmits at least the detected signal for authentication to the authentication server, and acquires an authentication result. There can be considered some patterns for an operation of the authentication process. Accordingly, the operation of the authentication process will be described below using flowcharts for each pattern.

The communication control section 239 has a function of controlling the communication with an apparatus authenticated by the authentication control section 237. In the present embodiment, the communication control section 239 establishes communication with a fixed projector control apparatus 100, and performs transmission/reception of information.

The communication section 250 is a communication interface configured from a communication device for connecting to an external device and the like. For example, in the case where the communication section 250 performs radio communication, the communication section 250 may include a communication antenna for transmitting/receiving a signal for communication, and a processing circuit for performing various signal processes for communication. Further, the communication section 250 may be a communication interface for wire communication. The data held by the communication section 250 and the data held by the authenticated fixed projector control apparatus 100 can be transmitted/received between the communication section 250 and the authenticated fixed projector control apparatus 100.

Heretofore, one of the examples of the functions of the mobile device 200 according to the present embodiment has been shown. Each of the above components may be configured using general-purpose members or circuits, or may be configured using hardware specialized for the function of each component. Further, the function of each component may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the mobile device 200 according to the present embodiment as described above, and the computer program can be implemented in a personal computer or the like. Further, there can also be provided a computer-readable recording medium in which the computer program is stored. Examples of the recording medium include a magnetic disk, an optical disk, a magneto-optical disk, and a flash memory. Further, the computer program may be distributed via a network without using the recording medium, for example.

[1-2. Authentication Process]

Next, an authentication process operations between the fixed projector control apparatus 100 and the mobile device 200 performed in the present embodiment will be classified into a plurality of patterns and each of the patterns will be described.

FIRST EXAMPLE

Figure 4A:
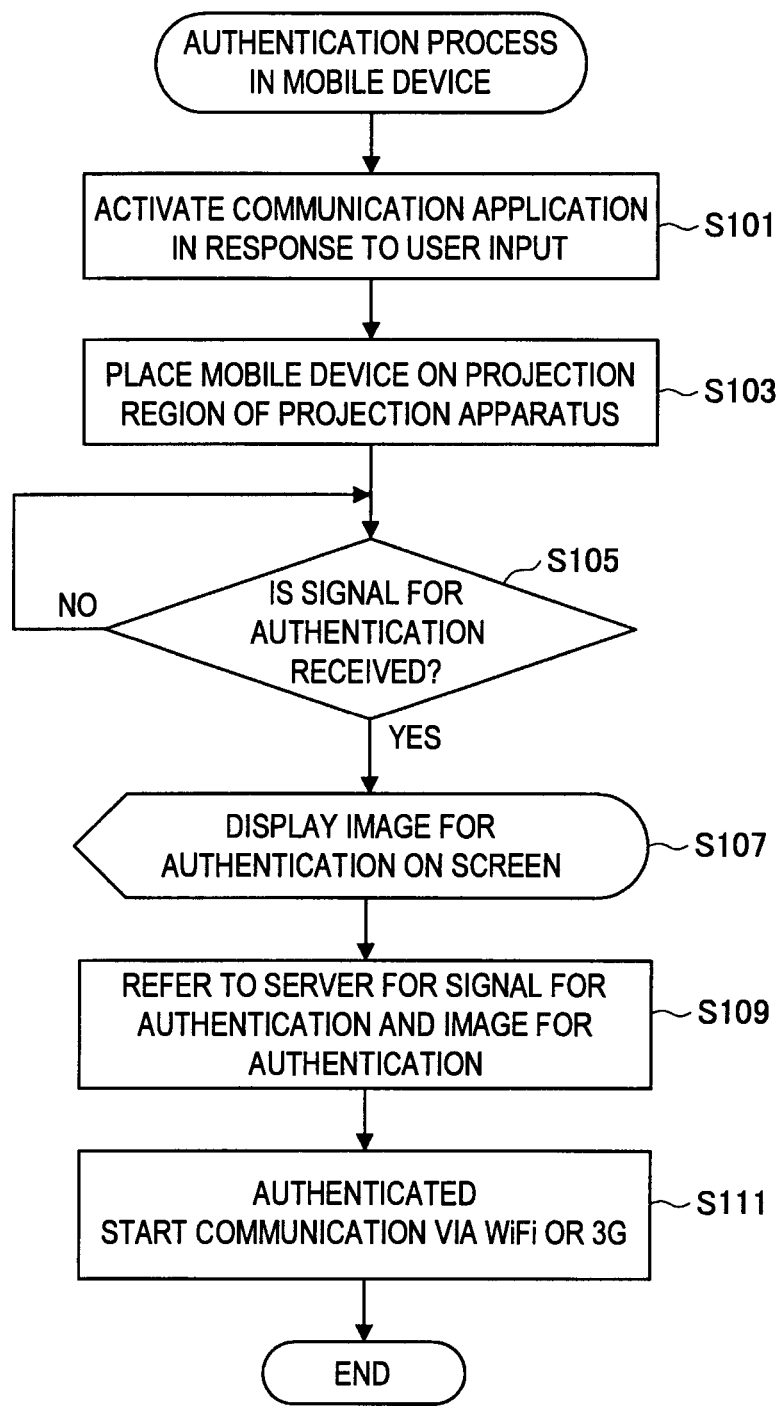
FIG. 4A is a flowchart showing an operation performed in the mobile device in a first example of an authentication process between devices.
Figure 5:
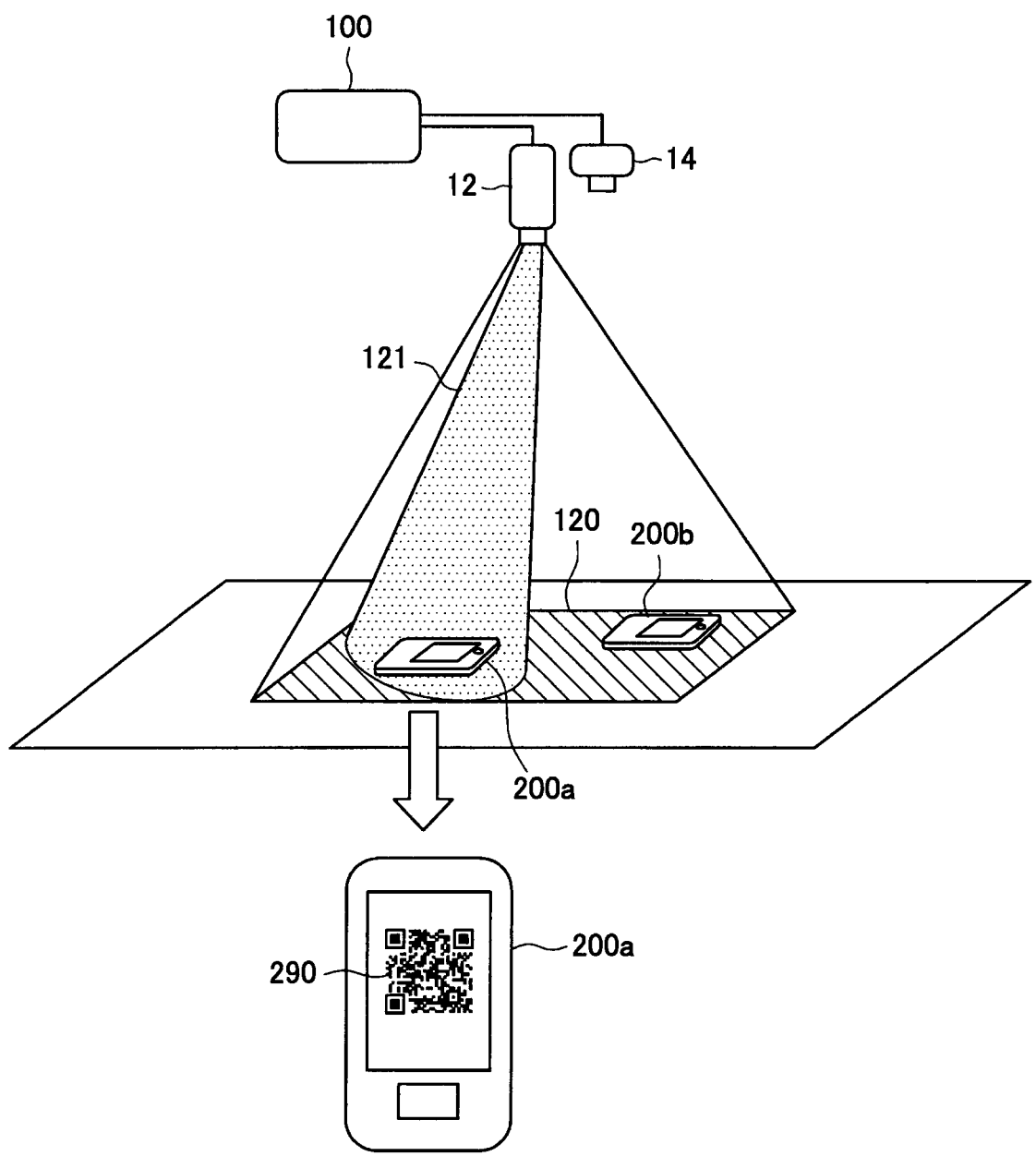
FIG. 5 is an explanatory diagram on the first example of the authentication process between devices.
Figure 6:
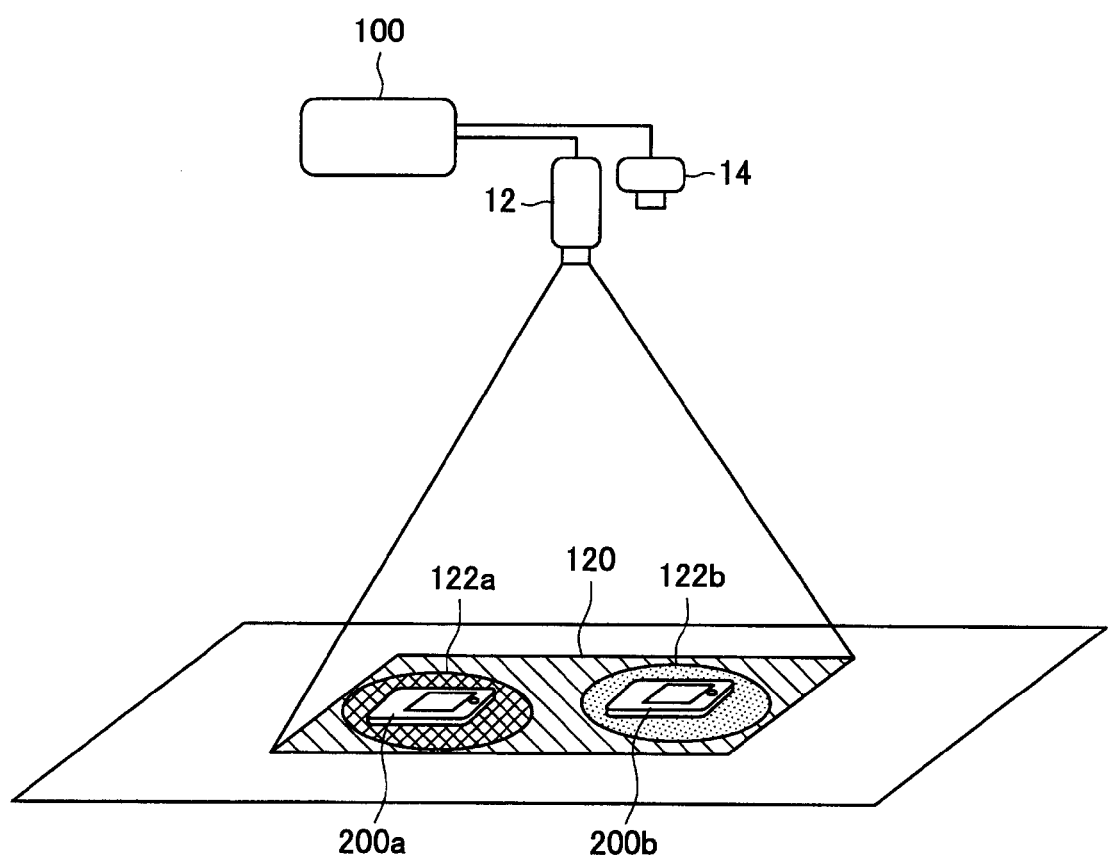
FIG. 6 is an explanatory diagram showing an example of an image projected by the fixed projector control apparatus after the authentication between devices.

First, with reference to FIGS. 4 to 6, a first example of the authentication process according to the present embodiment will be described. FIG. 4A is a flowchart showing an operation performed in the mobile device in the first example of the authentication process between devices. FIG. 4B is a flowchart showing an operation performed in the fixed projector control apparatus in the first example of the authentication process between devices. FIG. 5 is an explanatory diagram on the first example of the authentication process between devices. FIG. 6 is an explanatory diagram showing an example of an image projected by the fixed projector control apparatus after the authentication between devices.

First, referring to FIG. 4A, in the mobile device 200, the authentication control section 237 activates a communication application in response to a communication application activation operation performed by a user (S101). After that, the casing of the mobile device 200 is placed, by a user, within the projection region of the projection apparatus 12 (S103).

On the other hand, referring to FIG. 4B, in the fixed projector control apparatus 100, the authentication control section 137 causes the detection section 135 to determine whether or not a new mobile device 200 is detected within the projection region (S151). When the detection section 135 detects a new mobile device 200, the authentication control section 137 causes the projection control section 131 to project a signal for authentication in the vicinity of the detected mobile device 200 (S153).

Further, referring to FIG. 4A again, in the mobile device 200, the authentication control section 237 causes the detection section 235 to determine whether or not the signal for authentication is received based on the picked-up image acquired by the imaging section 213 (S105). Then, when the signal for authentication is detected by the detection section 235, the authentication control section 237 causes an image for authentication to be displayed on the display section 211 (S107). After that, the authentication control section 237 refers to a server for the detected signal for authentication and the image for authentication displayed on the display section 211, and acquires an authentication result (S109). When the signal for authentication and the image for authentication are authenticated, the communication control section 239 starts communication via WiFi or 3G (S111).

On the other hand, referring to FIG. 4B again, in the fixed projector control apparatus 100, it is determined whether or not the image for authentication is detected on the display screen of the mobile device 200 (S155). When the image for authentication is detected, the authentication control section 137 refers to a server for the projected signal for authentication and the detected image for authentication (S157). When the signal for authentication and the image for authentication are authenticated, the communication control section 139 starts communication via WiFi or 3G (S159).

Note that, in this case, as shown in FIG. 5, the image for authentication may be a two-dimensional code such as a QR code 290. Further, it is desirable that the signal for authentication 121 is projected only on the periphery of a mobile device 200*a*, which is an authentication target.

Further, as shown in FIG. 6, the projection control section 131 may project an authenticated image 122 indicating that the authentication is completed on the periphery of a position at which an authenticated mobile device 200 is placed. In this way, by visually feeding back the state of the mobile device 200, the user can intuitively recognize that the mobile device 200 is authenticated. Note that the authenticated image 122 is not limited to the example shown in FIG. 6, and may be a still image or a moving image indicating "authentication completed" or "communicating". For example, animation indicating "communicating" may be projected.

Heretofore, the first example of the authentication process between devices has been described. In the first example, the authentication process is triggered by the detection of the presence of the mobile device 200 within the projection region by the fixed projector control apparatus 100. In a second example to be described next, the mobile device 200 activates the communication application and also causes the image for authentication to be displayed on the display screen, and the fixed projector control apparatus 100 detects the displayed image for authentication.

SECOND EXAMPLE

Figure 7A:
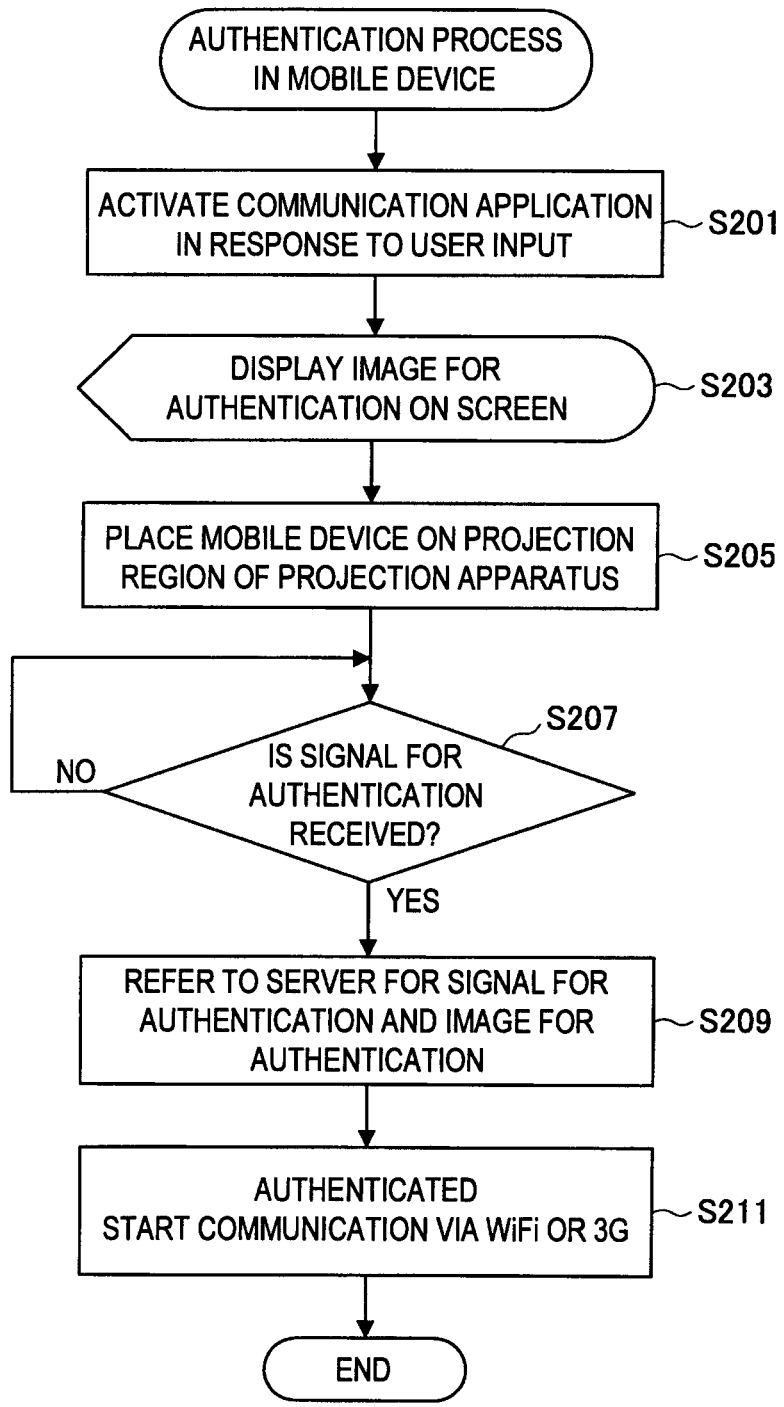
FIG. 7A is a flowchart showing an operation performed in the mobile device in a second example of the authentication process between devices.
Figure 7B:
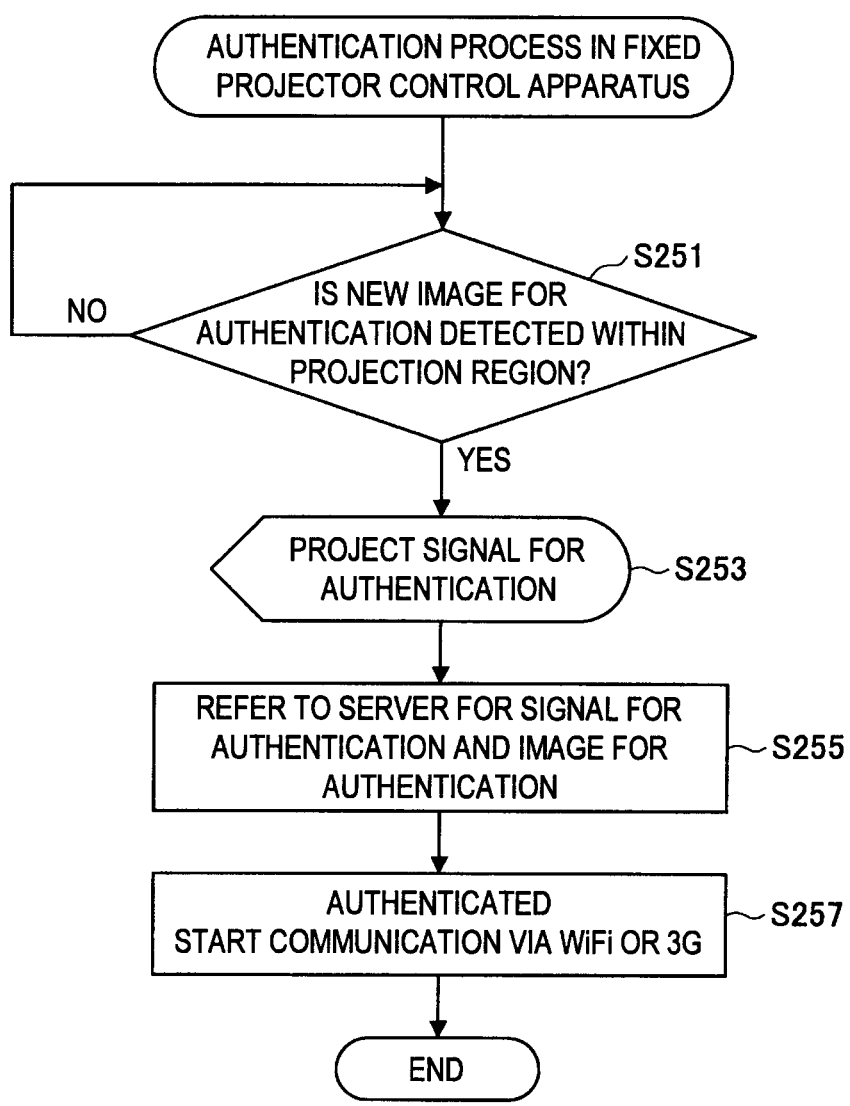
FIG. 7B is a flowchart showing an operation performed in the fixed projector control apparatus in the second example of the authentication process between devices.

Here, with reference to FIGS. 7A and 7B, a second example of the authentication process according to the present embodiment will be described. FIG. 7A is a flowchart showing an operation performed in the mobile device in the second example of the authentication process between devices. FIG. 7B is a flowchart showing an operation performed in the fixed projector control apparatus in the second example of the authentication process between devices.

First, referring to FIG. 7A, in the mobile device 200, the authentication control section 237 activates a communication application in response to a communication application activation operation performed by a user (S201). Then, with the activation of the communication application, the authentication control section 237 causes an image for authentication to be displayed on the display screen (S203). After that, the mobile device 200 is placed, by a user, within the projection region of the projection apparatus 12 (S205).

On the other hand, referring to FIG. 7B, in the fixed projector control apparatus 100, the authentication control section 137 causes the detection section 135 to determine whether or not a new image for authentication is detected within the projection region (S251). When the detection section 135 detects a new image for authentication, the authentication control section 137 causes the projection control section 131 to project a signal for authentication in the vicinity of the detected image for authentication (S253).

Here, the authentication control section 137 refers to a server for the projected signal for authentication and the detected image for authentication, and obtains an authentication result (S255). When the signal for authentication and the image for authentication are authenticated, the communication control section 239 starts communication via WiFi or 3G (S257).

Further, referring to FIG. 7A again, in the mobile device 200, the authentication control section 237 causes the detection section 235 to determine whether or not the signal for authentication is received based on the picked-up image acquired by the imaging section 213 (S207). Then, when the signal for authentication is detected by the detection section 235, the authentication control section 237 refers to a server for the detected signal for authentication and the image for authentication displayed on the display section 211, and acquires an authentication result (S209). When the signal for authentication and the image for authentication are authenticated, the communication control section 239 starts communication via WiFi or 3G (S211).

THIRD EXAMPLE

In the above, in the first example and the second example of the authentication process, the fixed projector control apparatus 100 and the mobile device 200 refer to the server for both the signal for authentication and the image for authentication, but the example is not limited thereto. Next, a third example which will be described next with reference to FIGS. 8A and 8B is different from the second example in that they refer to the server for only the information acquired from the other device.

Figure 8A:
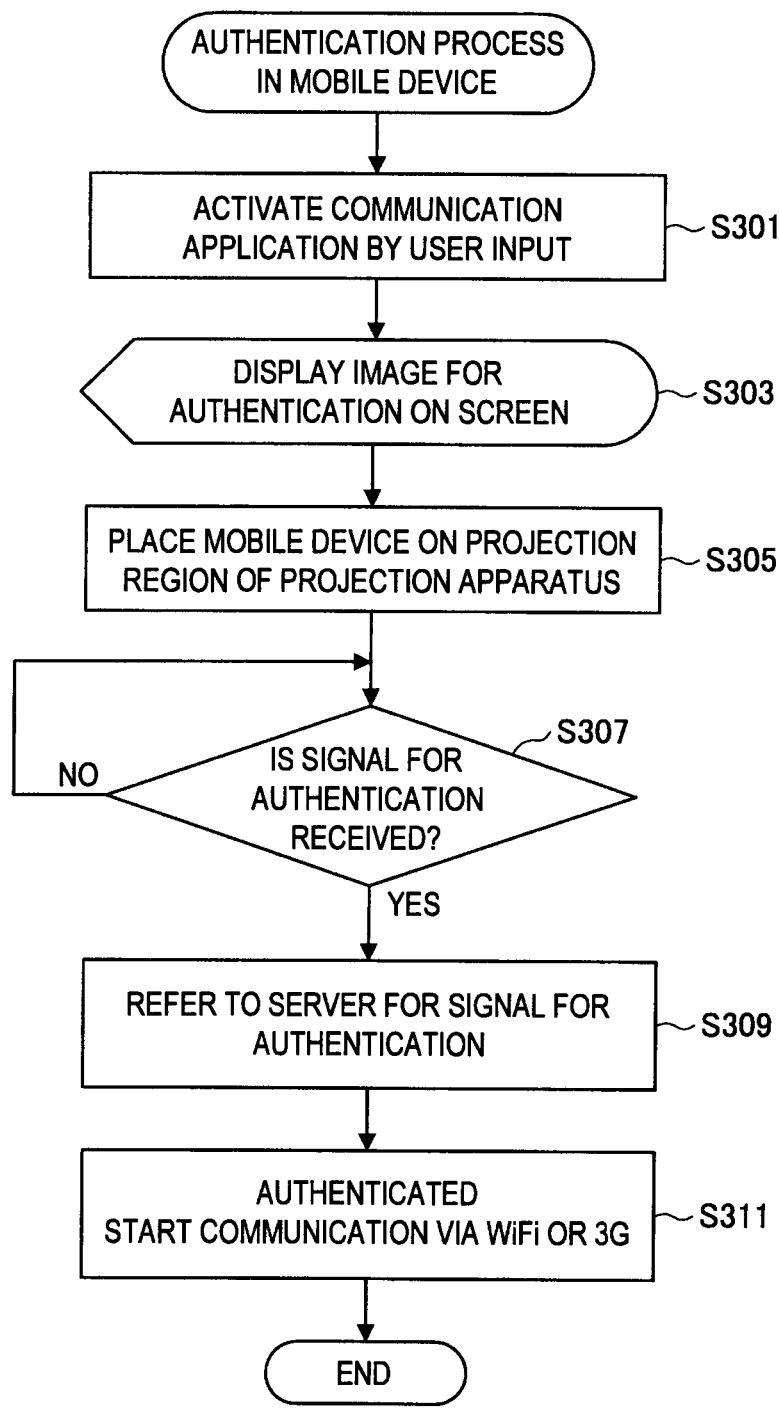
FIG. 8A is a flowchart showing an operation performed in the mobile device in a third example of the authentication process between devices.

FIG. 8A is a flowchart showing an operation performed in the mobile device in the third example of the authentication process between devices. FIG. 8B is a flowchart showing an operation performed in the fixed projector control apparatus in the third example of the authentication process between devices.

First, referring to FIG. 8A, in the mobile device 200, the authentication control section 237 activates a communication application in response to a communication application activation operation performed by a user (S301). Then, with the activation of the communication application, the authentication control section 237 causes an image for authentication to be displayed on the display screen (S303). After that, the mobile device 200 is placed, by a user, within the projection region of the projection apparatus 12 (S305).

Figure 8B:
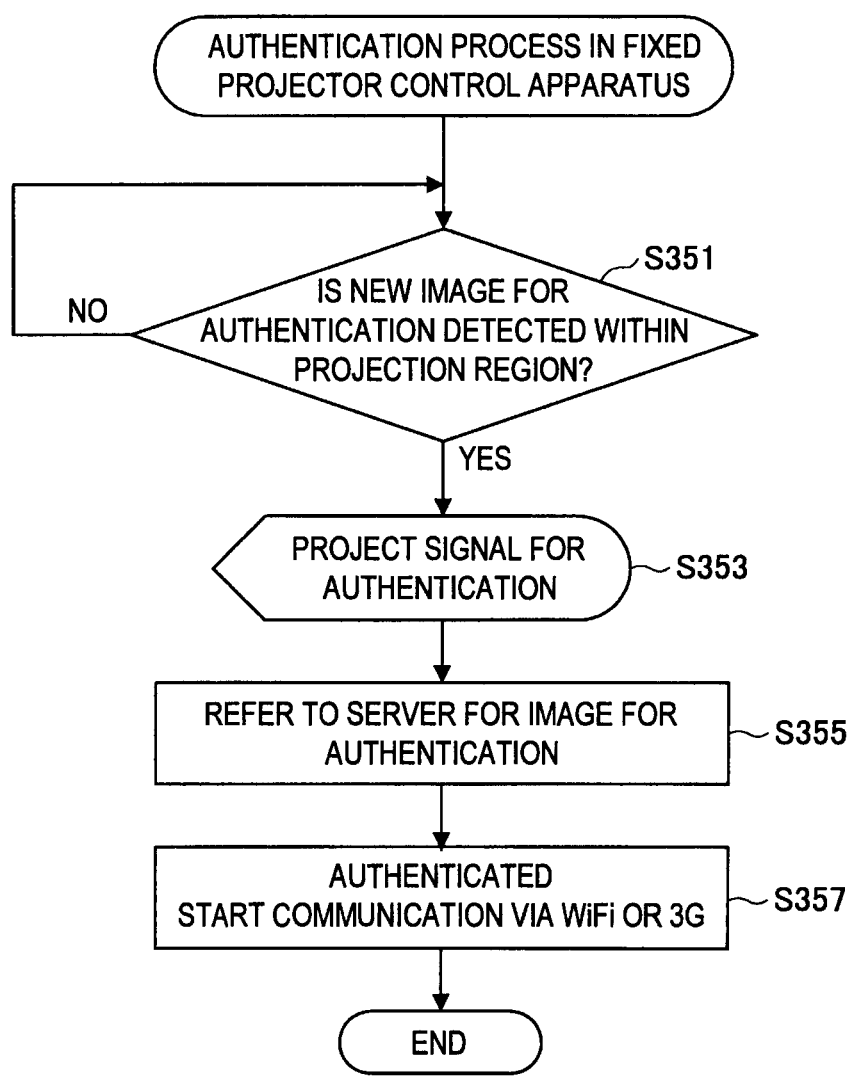
FIG. 8B is a flowchart showing an operation performed in the fixed projector control apparatus in the third example of the authentication process between devices.

On the other hand, referring to FIG. 8B, in the fixed projector control apparatus 100, the authentication control section 137 causes the detection section 135 to determine whether or not a new image for authentication is detected within the projection region (S351). When the detection section 135 detects a new image for authentication, the authentication control section 137 causes the projection control section 131 to project a signal for authentication in the vicinity of the detected image for authentication (S353).

Here, the authentication control section 137 refers to a server for the detected image for authentication, and obtains an authentication result (S355). When the image for authentication is authenticated, the communication control section 239 starts communication via WiFi or 3G (S357).

Further, referring to FIG. 8A again, in the mobile device 200, the authentication control section 237 causes the detection section 235 to determine whether or not the signal for authentication is received based on the picked-up image acquired by the imaging section 213 (S307). Then, when the signal for authentication is detected by the detection section 235, the authentication control section 237 refers to a server for the detected signal for authentication, and acquires an authentication result (S309). When the signal for authentication is authenticated, the communication control section 239 starts communication via WiFi or 3G (S311).

In this way, since the fixed projector control apparatus 100 and the mobile device 200 refer to the server for only the information acquired from the other device, the information to be transmitted to the server is decreased, and hence, the processing is further simplified.

FOURTH EXAMPLE

In each of the first to third examples of the authentication process described above, an application for communication is activated by user operation. Accordingly, it is necessary that the user performs operation of activating the application and placing the mobile device 200 on the projection region. Here, in order to further simplify the user operation, with reference to FIGS. 9A and 9B, there will be described authentication operation in the case where the communication application is a resident application and the user does not have to perform application activating operation.

Figure 9B:
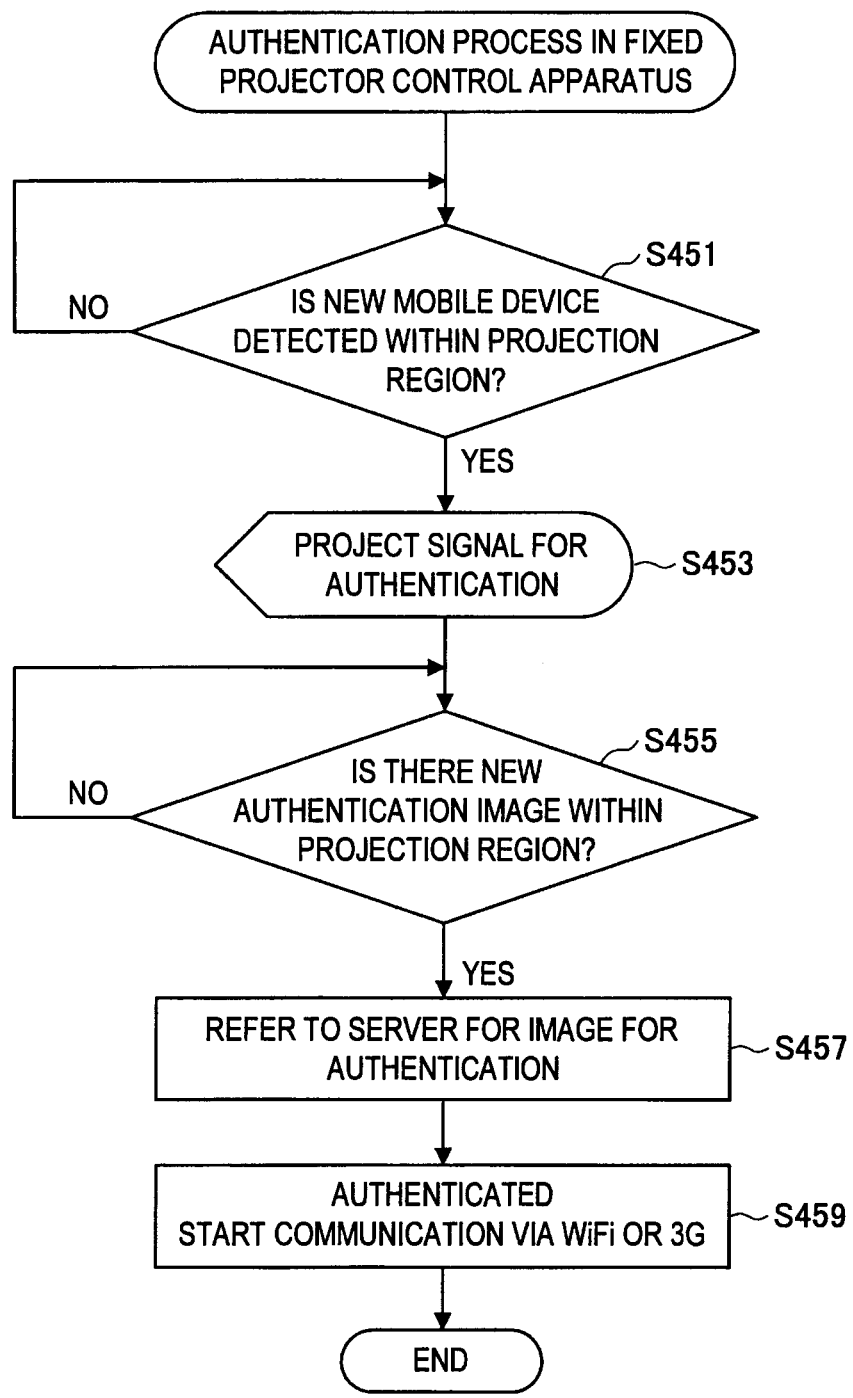
FIG. 9B is a flowchart showing an operation performed in the fixed projector control apparatus in the fourth example of the authentication process between devices.

FIG. 9A is a flowchart showing an operation performed in the mobile device in a fourth example of the authentication process between devices. FIG. 9B is a flowchart showing an operation performed in the fixed projector control apparatus in the fourth example of the authentication process between devices.

Referring to FIG. 9A, first, the communication application resides in the mobile device 200, and the mobile device 200 is in a state waiting for an authentication signal to be projected (S401). The mobile device 200 in this state is placed, by a user, within the projection region of the projection apparatus 12 (S403).

Here, referring to FIG. 9B, in the fixed projector control apparatus 100, the authentication control section 137 causes the detection section 135 to determine whether or not a new mobile device 200 is detected within the projection region (S451). When the new mobile device 200 is detected, the authentication control section 137 causes the projection control section 131 to project a signal for authentication (S453).

Referring to FIG. 9A again, in the mobile device 200, the authentication control section 237 causes the detection section 235 to determine whether or not the signal for authentication is received based on the picked-up image acquired by the imaging section 213 (S405). Then, when the signal for authentication is detected by the detection section 235, the authentication control section 237 causes the image for authentication to be displayed on the display screen of the display section 211 (S407). After that, the authentication control section 237 refers to a server for the received signal for authentication and acquires an authentication result (S409). When the signal for authentication is authenticated, the communication control section 239 starts communication via WiFi or 3G (S411).

On the other hand, referring to FIG. 9B again, in the fixed projector control apparatus 100, the authentication control section 137 causes the detection section 135 to determine whether or not a new authentication image is detected within the projection region (S455). When the authentication image is detected, the authentication control section 137 refers to a server for the detected authentication image, and acquires an authentication result (S457). When the authentication image is authenticated, the communication control section 139 starts communication via WiFi or 3G (S459).

According to the fourth example of the authentication process described above, the communication can be started without performing, by the user, the operation of activating the communication application, and only by placing the mobile device 200 within the projection region. However, since it is necessary that the authentication signal be detected continually, it is necessary that the imaging section 213 be activated. Accordingly, there is an issue that the standby electricity consumption increases, but when an issue on battery capacity is solved, there can be achieved an effect for the user that the preparation for communication can be performed with fewer operations.

FIFTH EXAMPLE

Figure 10A:
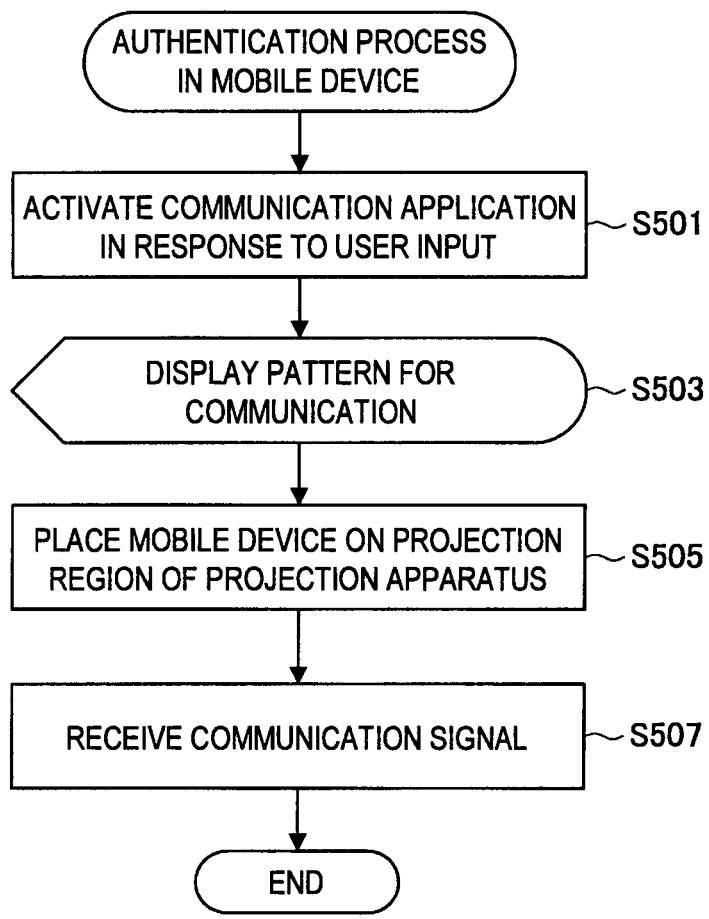
FIG. 10A is a flowchart showing an operation performed in the mobile device in a fifth example of the authentication process between devices.
Figure 10B:
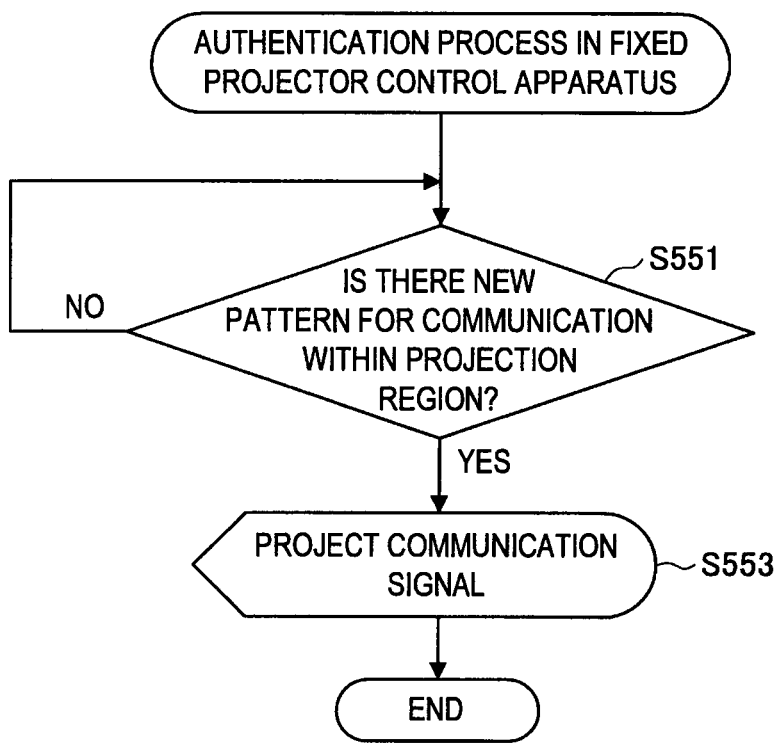
FIG. 10B is a flowchart showing an operation performed in the fixed projector control apparatus in the fifth example of the authentication process between devices.

In each of the first to fourth examples of the authentication processes described above, there are described processes for starting communication via WiFi or 3G. However, the fixed projector control apparatus 100 and the mobile device 200 may perform ad hoc communication with each other using a projector or a display screen of a mobile device and an image sensor as communication means. The operation in this case will be described with reference to FIGS. 10A and 10B. FIG. 10A is a flowchart showing an operation performed in the mobile device in a fifth example of the authentication process between devices. FIG. 10B is a flowchart showing an operation performed in the fixed projector control apparatus in the fifth example of the authentication process between devices.

First, referring to FIG. 10A, in the mobile device 200, the authentication control section 237 activates a communication application in response to a communication application activation operation performed by a user (S501). When the communication application is activated, the authentication control section 237 causes the display section 211 to display a pattern for communication on the display screen (S503). The mobile device 200 in this state is placed, by a user, within the projection region of the projection apparatus 12 (S505).

On the other hand, referring to FIG. 10B, in the fixed projector control apparatus 100, the authentication control section 137 causes the detection section 135 to determine whether or not a new pattern for communication is detected within the projection region (S551). Then, when the new pattern for communication is detected, the authentication control section 137 projects a communication signal on the mobile device 200 (S553).

Then, in the mobile device 200, the communication signal is detected by the detection section 235 based on the picked-up image (S507).

The communication signal used here may be pulsed light emission, for example. Here, it is preferred that the frequency of the pulsed light emission be equal to or less than a half (15 fps or 30 fps) of the sampling frequency (30 fps or 60 fps) at the camera side of the receiving device. In the case where the sampling frequency at the camera side of the receiving device is unknown, information of the sampling frequency of a camera may be exchanged between the devices at the beginning.

Further, although there has been shown the case of transmitting the information from the fixed projector control apparatus 100 to the mobile device 200, it may be the other way around. That is, the information may be transmitted from the mobile device 200 to the fixed projector control apparatus 100. In this case, since the fixed projector control apparatus 100 can look down upon the entire display screen of the mobile device 200, there are considered communication using a one-dimensional line (bar code and the like) and two-dimensional surface (QR code, CyberCode, and the like), in addition to the pulsed light emission.

Note that, although the ad hoc communication is performed using a temporally changing dynamic signal in the description above, the signal used for the communication may not necessarily be a dynamic signal. In the case where the display screen can be looked down upon and the amount of information to be exchanged is small, the exchange of information may be performed using a static signal such as a QR code. Further, it is also possible to use a projected image and ad hoc communication in combination. For example, it is also possible to perform exchange of information attached to a projected photograph by the ad hoc communication. In this case, the photograph data can be retrieved from the picked-up image as it is, and the attached information can be acquired by communication.

Heretofore, there have been described authentication processes between the fixed projector control apparatus 100 and the mobile device 200 according to the present embodiment with reference to five patterns. In each pattern, the user can start the communication only by activating the communication application and placing the mobile device 200 on the projection region, or by simply placing the mobile device 200 on the projection region.

For example, particularly in the case of attempting to establish temporal communication, it is important that the preparation for the communication is not so troublesome for the user. For the spread of a service, it is desirable that the service is easily understandable for a general user. According to the above authentication process, the user can easily start communication with the fixed projector control apparatus 100. Next, there will be described examples of services that can be realized by using the communication, the user operation at that time, and interaction processes between a projection image projected by the projection apparatus 12 and the user operation.

[1-3. Interaction]

Next, with reference to FIGS. 11 to 16, an interaction between a projection image and the mobile device 200 according to the present embodiment will be described with three examples of services.

Figure 12:
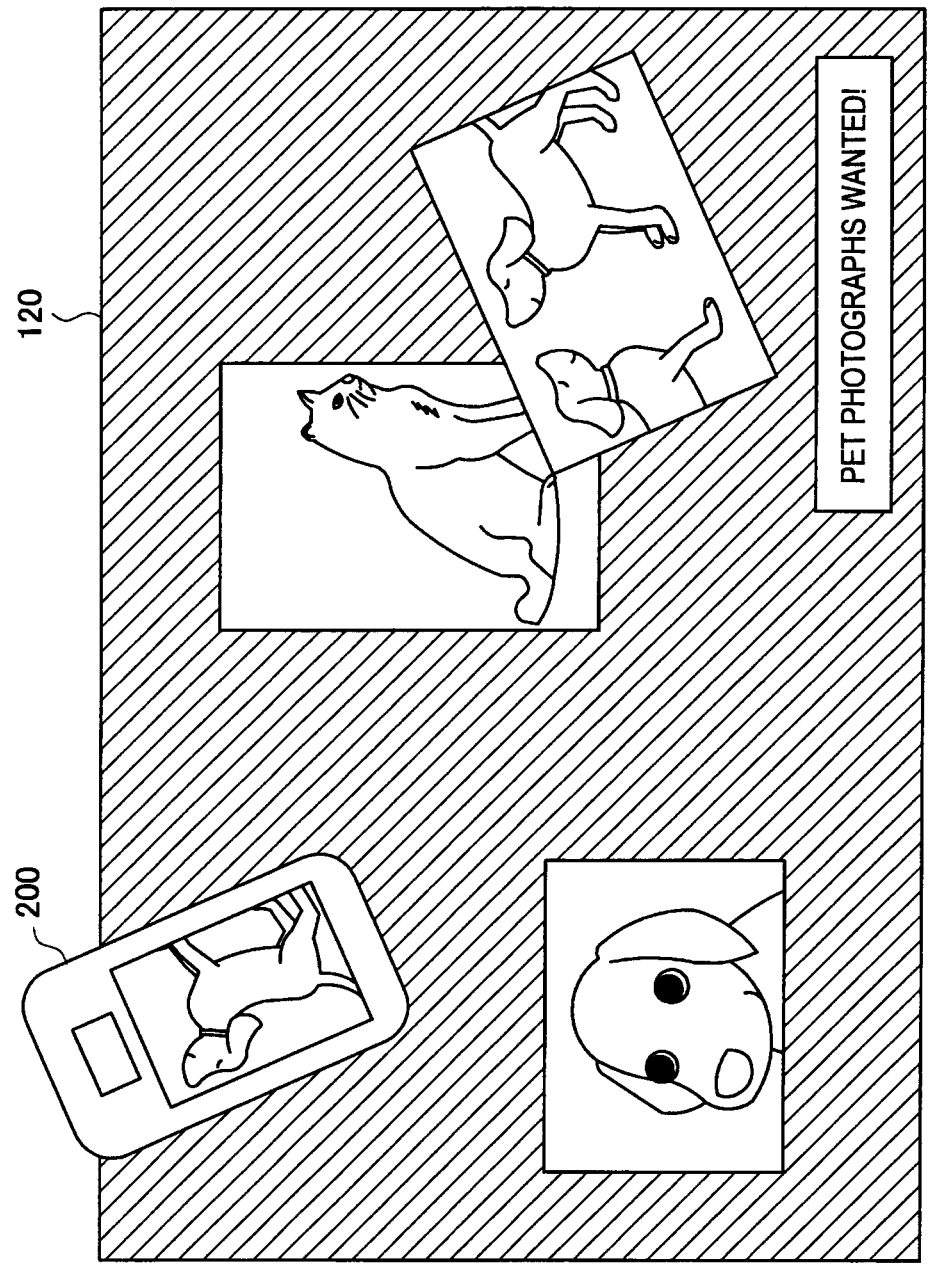
FIG. 12 is an explanatory diagram illustrating an operation in a second example of the service which can be realized by the information processing system according to the embodiment.
Figure 13:
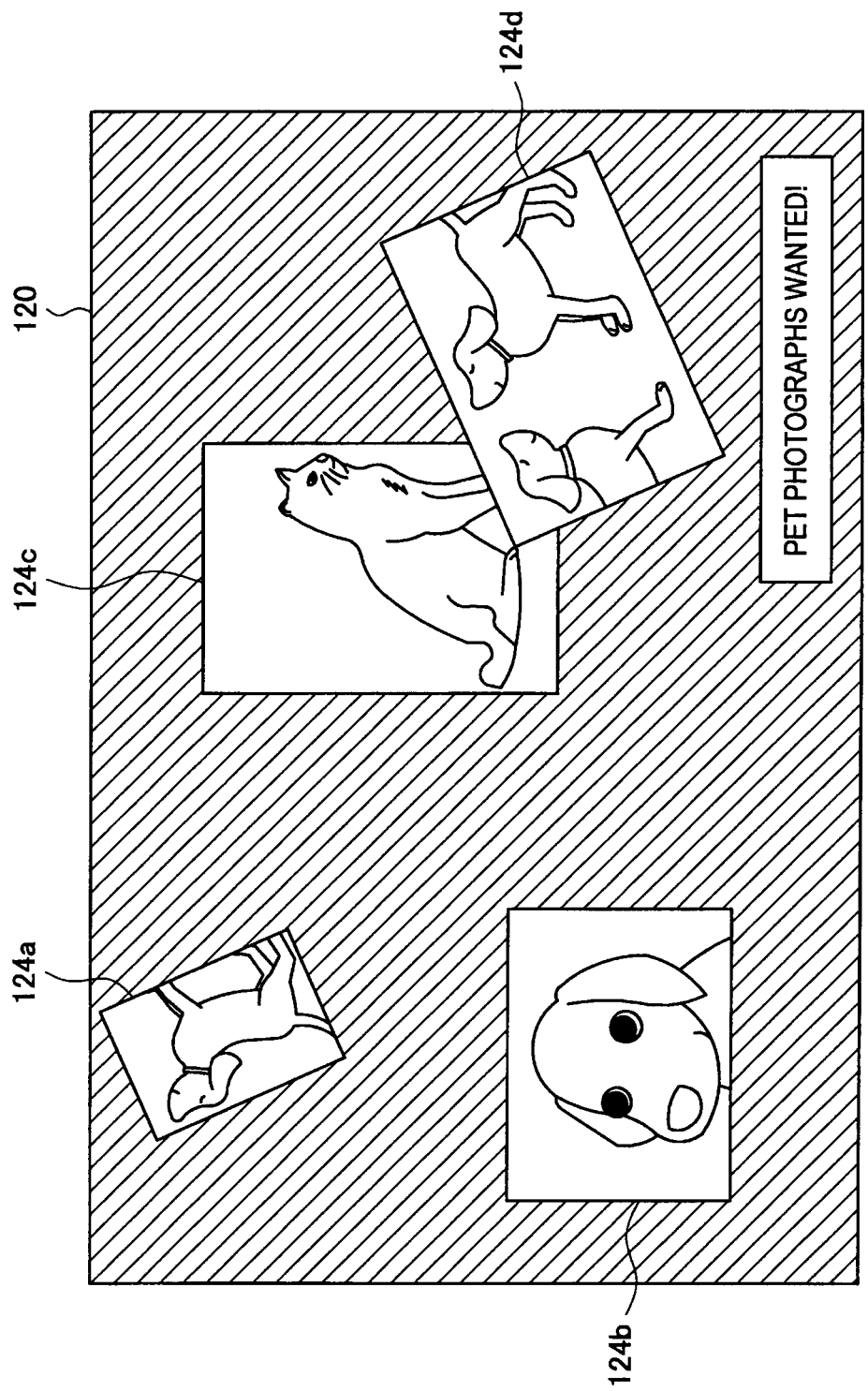
FIG. 13 is an explanatory diagram illustrating an operation in the second example of the service which can be realized by the information processing system according to the embodiment.
Figure 14:
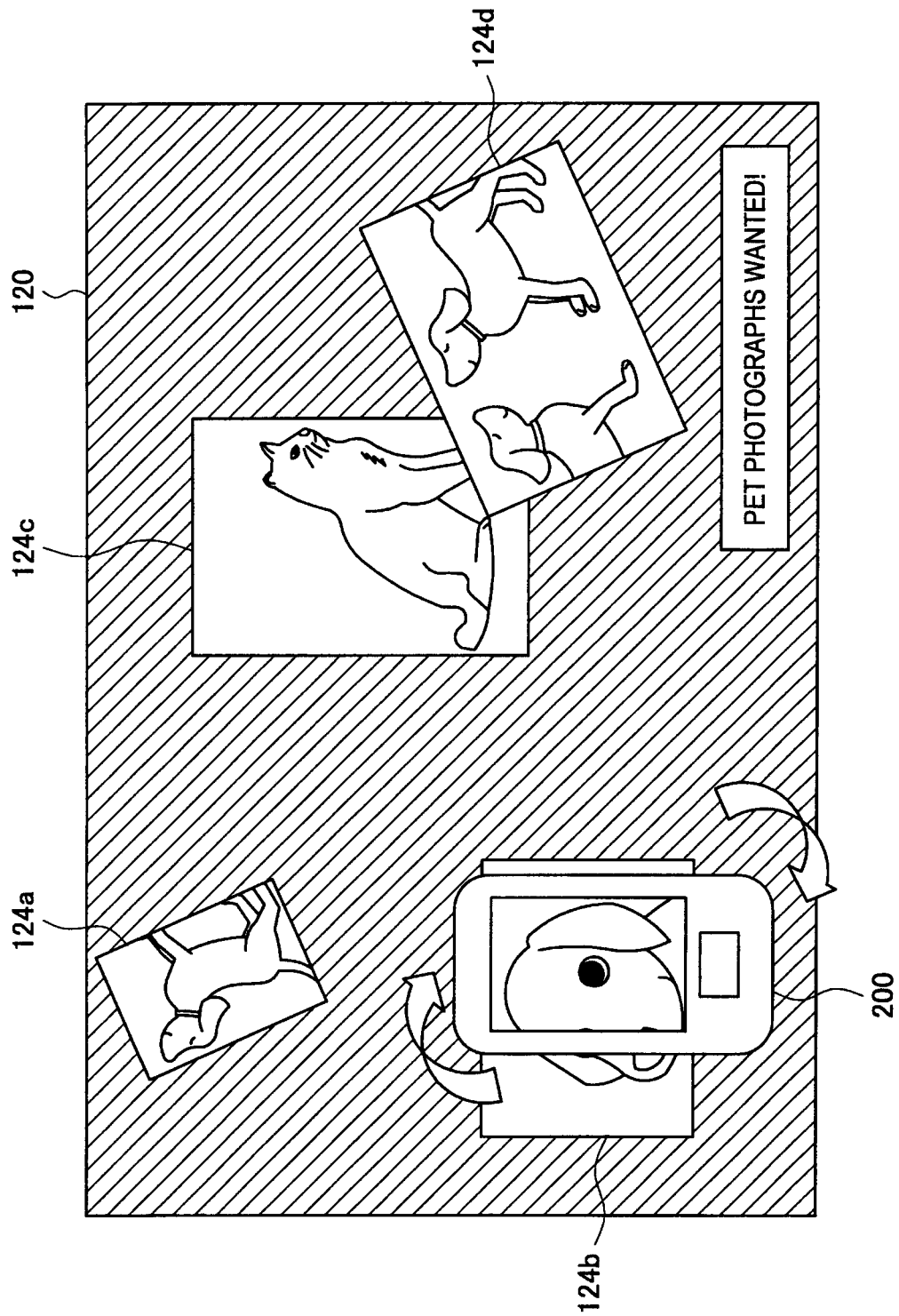
FIG. 14 is an explanatory diagram illustrating an operation in the second example of the service which can be realized by the information processing system according to the embodiment.
Figure 15:
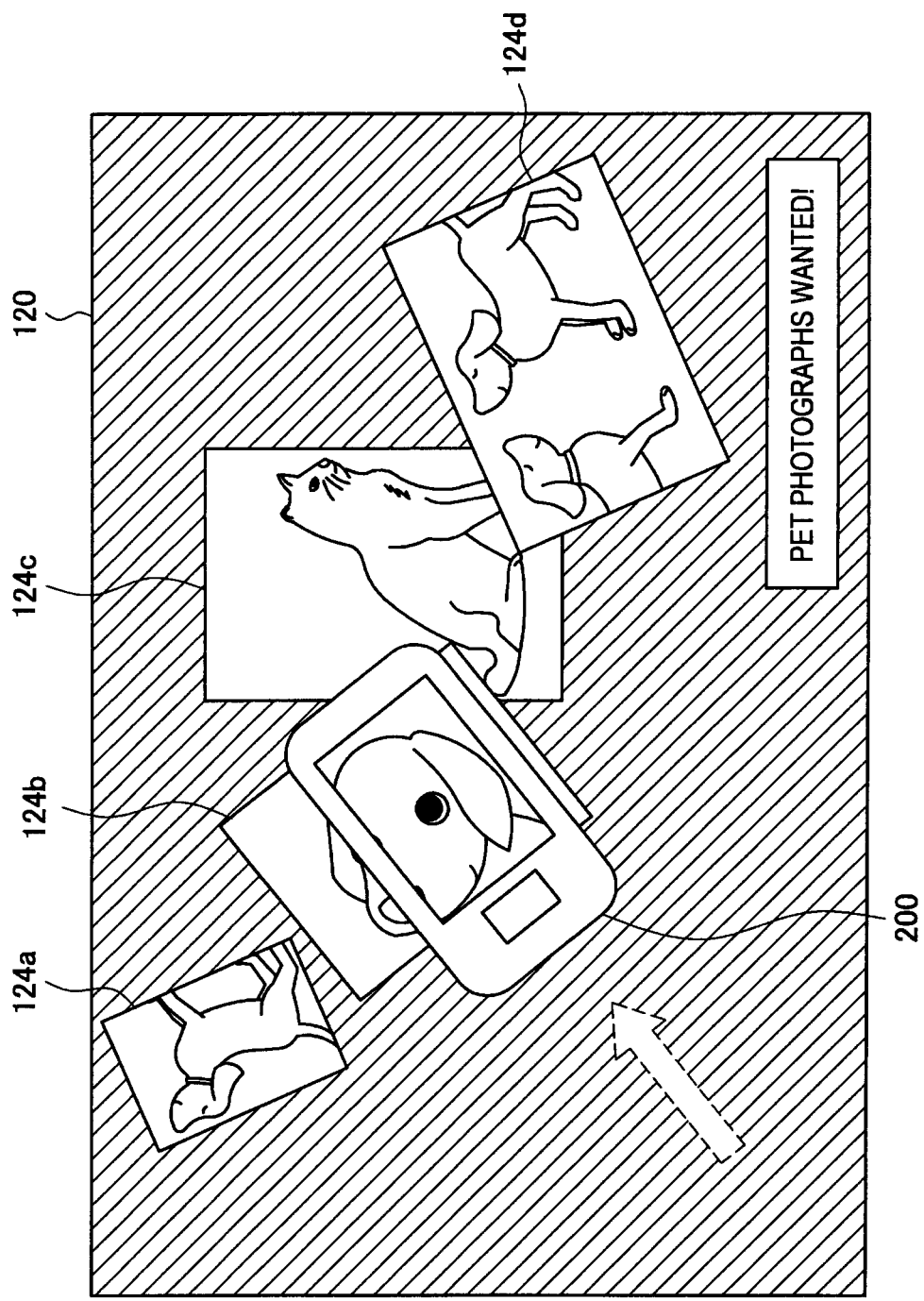
FIG. 15 is an explanatory diagram illustrating an operation in the second example of the service which can be realized by the information processing system according to the embodiment.
Figure 16:
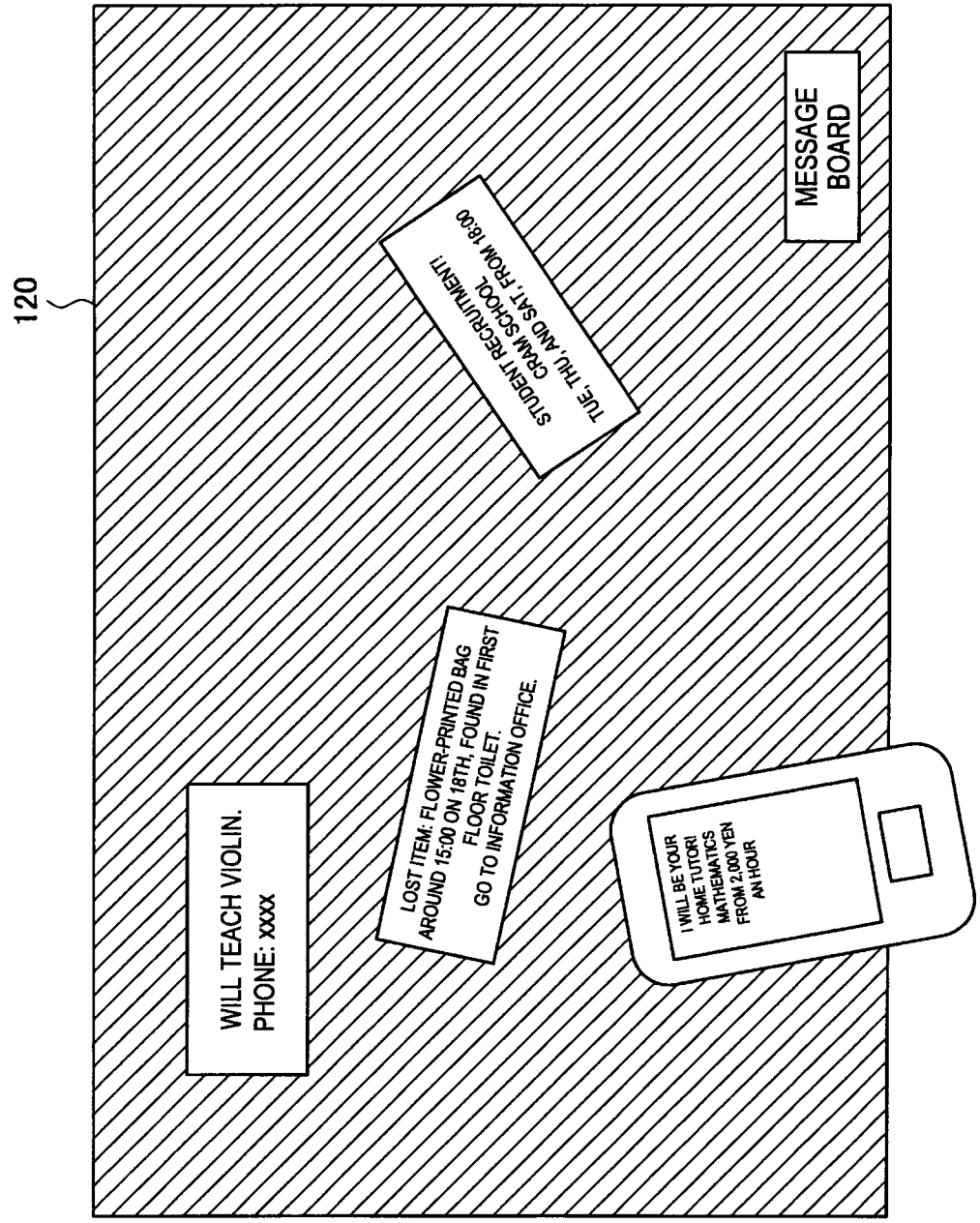
FIG. 16 is an explanatory diagram illustrating an operation in a third example of the service which can be realized by the information processing system according to the embodiment.
Figure 17:
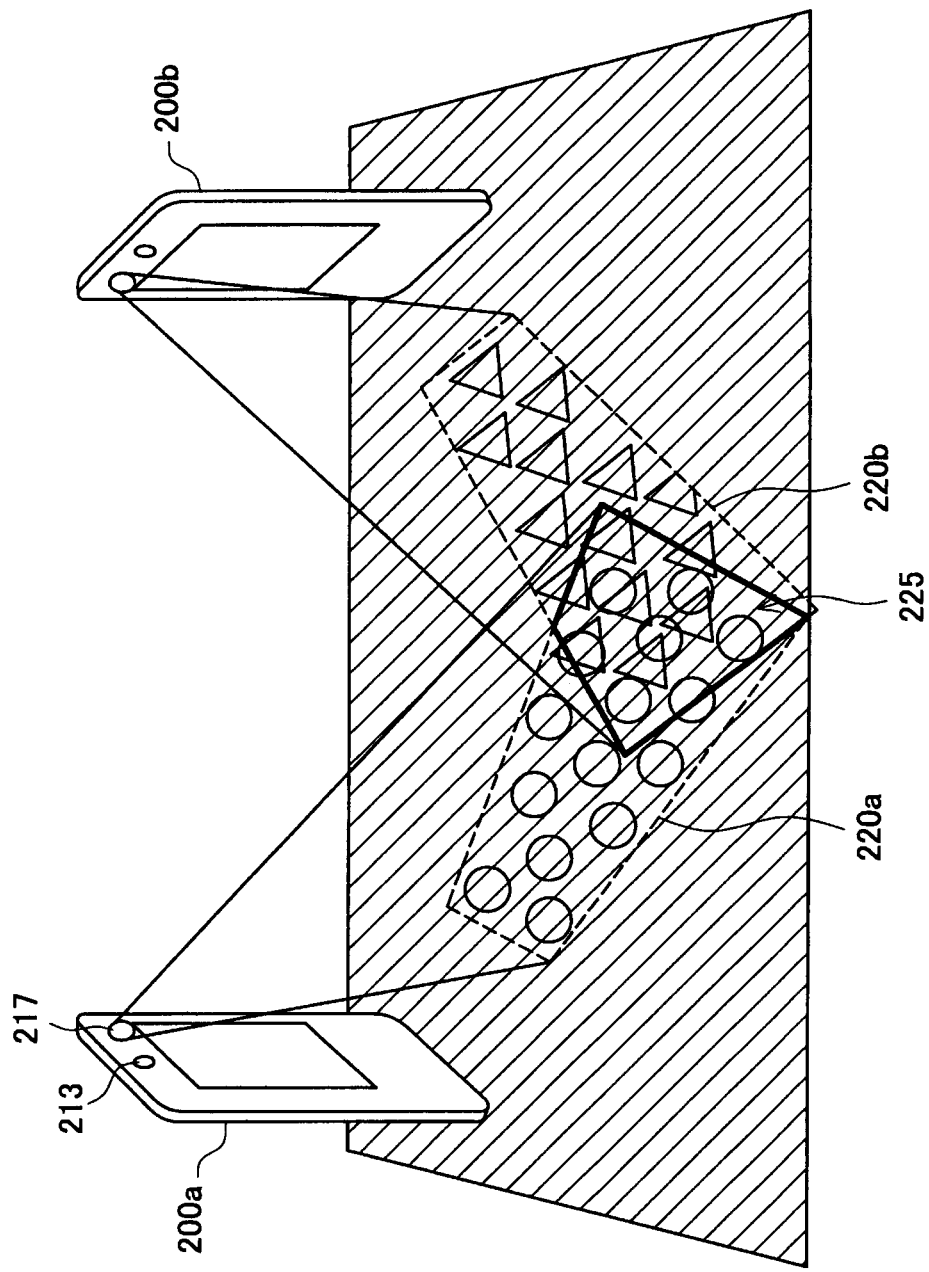
FIG. 17 is an explanatory diagram showing an outline of an information processing system according to a second embodiment of the present disclosure.

FIG. 11 is an explanatory diagram illustrating an operation in a first example of a service which can be realized by the information processing system according to the embodiment. FIG. 12 is an explanatory diagram illustrating an operation in a second example of the service which can be realized by the information processing system according to the embodiment. FIG. 13 is an explanatory diagram illustrating an operation in the second example of the service which can be realized by the information processing system according to the embodiment. FIG. 14 is an explanatory diagram illustrating an operation in the second example of the service which can be realized by the information processing system according to the embodiment. FIG. 15 is an explanatory diagram illustrating an operation in the second example of the service which can be realized by the information processing system according to the embodiment. FIG. 16 is an explanatory diagram illustrating an operation in a third example of the service which can be realized by the information processing system according to the embodiment.

First, with reference to FIG. 11, a first service example will be described. For example, the information processing system 1 according to the present embodiment can be applied to digital signage. The digital signage is an advertising medium which displays video and information using a display apparatus and communication. Since the digital signage can change display contents using communication, the digital signage is becoming widespread.

In FIG. 11, there is shown a state on the projection area 120 projected by the projection apparatus 12. For example, let us assume that an advertisement of a car is displayed. When the user holds a mobile device 200a over an object image 123 in a projection image projected on the projection area 120, the authentication process described above is automatically executed, and content shown as the object image 123 can be acquired.

In this case, the communication control section 139 of the fixed projector control apparatus 100 causes the detection section 135 to analyze a picked-up image of the imaging apparatus 14 acquired by the image acquisition section 133, thereby acquiring position information of the mobile device 200a within the projection region. Then, based on the acquired position information, the communication control section 139 identifies the object image 123, and transmits content data of the identified object image 123 to the mobile device 200a. Here, the detection section 135 may also detect an orientation of the mobile device 200a. The communication control section 139 may also transmit, among object images 123, image data in a region imaged by the imaging section 213 of the mobile device 200 based on the detected orientation and position of the mobile device 200a. According to such a configuration, the user can obtain, among the object images 123, the image data in the region that the user acquired by the imaging section 213, only by holding the mobile device 200 over the object images 123.

Further, the detection section 135 may also detect a change in a distance between the mobile device 200 and the imaging apparatus 14. For example, the communication control section 139 can change information to be transmitted to the mobile device 200 in accordance with the change in the distance. For example, as shown in the mobile device 200a, when it is detected that the mobile device 200a stops moving at a predetermined distance, the image data of the object image 123 may be transmitted as described above, based on the position information and the orientation within the projection region of the mobile device 200a at that position. Further, when the user moves the mobile device 200 on the object image in a direction that the mobile device 200 moves away from the screen or in a direction that the mobile device 200 approaches the screen, the communication control section 139 can also transmit other information associated with the object image 123 to the mobile device 200. For example, in FIG. 11, there is shown an example in which detailed information on the car associated with the object image can be referred to in the mobile device 200b.

Further, the detection section 135 detects the change in the distance between the mobile device 200 and the imaging apparatus 14, and the fixed projector control apparatus 100 can detect every operation performed by the mobile device 200. For example, the fixed projector control apparatus 100 can detect operation of scooping up the object image 123. In the above, it is described that some of the object images 123 can be acquired in accordance with the orientation of the mobile device 200a, but there may be a case where user wants entire data of the object images. Accordingly, when the user performs the scooping operation on each of the object images 123, the detection section 135 detects the operation, and the communication control section 139 may transmit the entire data of the corresponding object images 123 to the mobile device 200. According to such a configuration, the user performs the scooping operation to the images that the user wants to acquire from among a plurality of object images one after another, and then two or more pieces of information are transmitted into the mobile device 200.

Next, with reference to FIGS. 12 to 15, a second service example will be described. For example, the information processing system 1 according to the present embodiment can be used as a space for communication between users.

For example, the fixed projector control apparatus 100 displays a message "PET PHOTOGRAPHS WANTED!" on the projection area 120. When the user holds the mobile device 200 in a state where a pet photograph is displayed on the display section 211 over the projection region, the communication control section 139 of the fixed projector control apparatus 100 acquires, from the mobile device 200, the photograph displayed on the display section 211, and projects the photograph on the projection area 120. In this case, the projection control section 131 may acquire a position and an orientation of the mobile device 200 at the time of content acquisition, and may determine a position of the object image 124 on the projection area based on the acquired position and orientation. For example, as shown in FIG. 13, the object image 124a is projected at the position and orientation of the mobile device 200 shown in FIG. 12.

In this case, in the case where there is performed an operation of holding the mobile device 200 over the region that overlaps with the position at which the object image 124c is already projected, the projection control section 131 may project a projection image in a state that an object image 124d of content acquired afterwards is superimposed on the object image 124c which has been projected first. Alternatively, a distance between the mobile device 200 and the imaging apparatus 14 may be detected by the detection section 135, and the projection control section 131 may project each object image 124 in a different size in accordance with the distance.

Further, the detection section 135 detects the change in the position of the mobile device 200 and the distance, and can detect that the user performs an operation of swinging the mobile device 200 up and down. For example, when the user performs the operation of swinging the mobile device 200 up and down while a screen in which a plurality of pieces of reduced data of photographs are arranged is being displayed, the communication control section 139 acquires the displayed photograph data pieces, and the projection control section 131 may generate and project a projection image in which the displayed photograph data pieces are falling down scatteringly. Accordingly to such a configuration, there can be provided an intuitive interaction for the user.

Further, the detection section 135 detects the change in the orientation of the mobile device 200, and can detect a rotation operation of the mobile device 200. For example, as shown in FIG. 14, when the operation of rotating the mobile device 200 on the object image 124b is performed, the detection section 135 detects the rotation operation. Then, the projection control section 131 projects a projection image which includes the object image 124b at a position and an orientation each corresponding to the detected position and orientation of the mobile device 200. FIG. 15 shows a state of the object image 124b while being moved.

Next, with reference to FIG. 16, a third service example will be described. For example, the information processing system 1 according to the present embodiment can also be used as a message board. Since the operation thereof is the same as the second service example, the detailed description will be omitted here. When the user holds the mobile device 200 over the projection region or places the mobile device 200 on the projection region in the state where information that the user wants to attach on the message board is displayed on the display section 211, the information inside the mobile device 200 is transmitted to the fixed projector control apparatus 100, and is also reflected in the projection image. Such structure can be applied to a card game, for example. The user holds the mobile device 200 in the state of displaying a selected card over the projection region, thereby placing the card at a place.

Heretofore, the first embodiment of the present disclosure has been described. In the above, although there has been described cooperation between the fixed projector control apparatus 100 which controls a fixed-type projector and the mobile device 200 which is a mobile terminal, cooperation can also be realized even between mobile devices, by using a projection apparatus and an imaging apparatus.

2. Second Embodiment

[2-1. Configuration]

An information processing system 2 according to a second embodiment of the present disclosure has a plurality of mobile devices 200. As for the configuration of the mobile device 200, detailed description will be omitted for the same parts as those described in FIG. 3.

As a premise, a projection area 220a of a first mobile device 200a and a projection area 220b of a second mobile device 200b are arranged such that there is a common region 225, which represents a part in which a part of the projection area 220a and a part of the projection area 220b overlap with each other. Note that an imaging section 213a of the first mobile device 200a images a region of the projection area 220a, and an imaging section 213b of the second mobile device 200b images a region of the projection area 220b.

[2-2. Operation]

(Authentication Operation)

First, authentication between two mobile devices 200 will be described. For example, when detecting that a part of the projection image of one mobile device 200 overlaps with a part of the projection image of the other mobile device 200, the mobile devices 200 enter authentication mode. For example, in the case where the projection image originally projected by one mobile device 200 is different from the image of the projection area acquired by the imaging section 213, image information of the difference is transmitted to an authentication server. Then, the authentication server establishes an authentication relationship with image information having high degree of similarity included in another image information group given to the server. If the mobile device 200a and the mobile device 200b each transmit the image of the common region 225, which is the overlapping part, to the authentication server, it may be highly possible that the authentication server can find an image with high degree of similarity.

Figure 18:
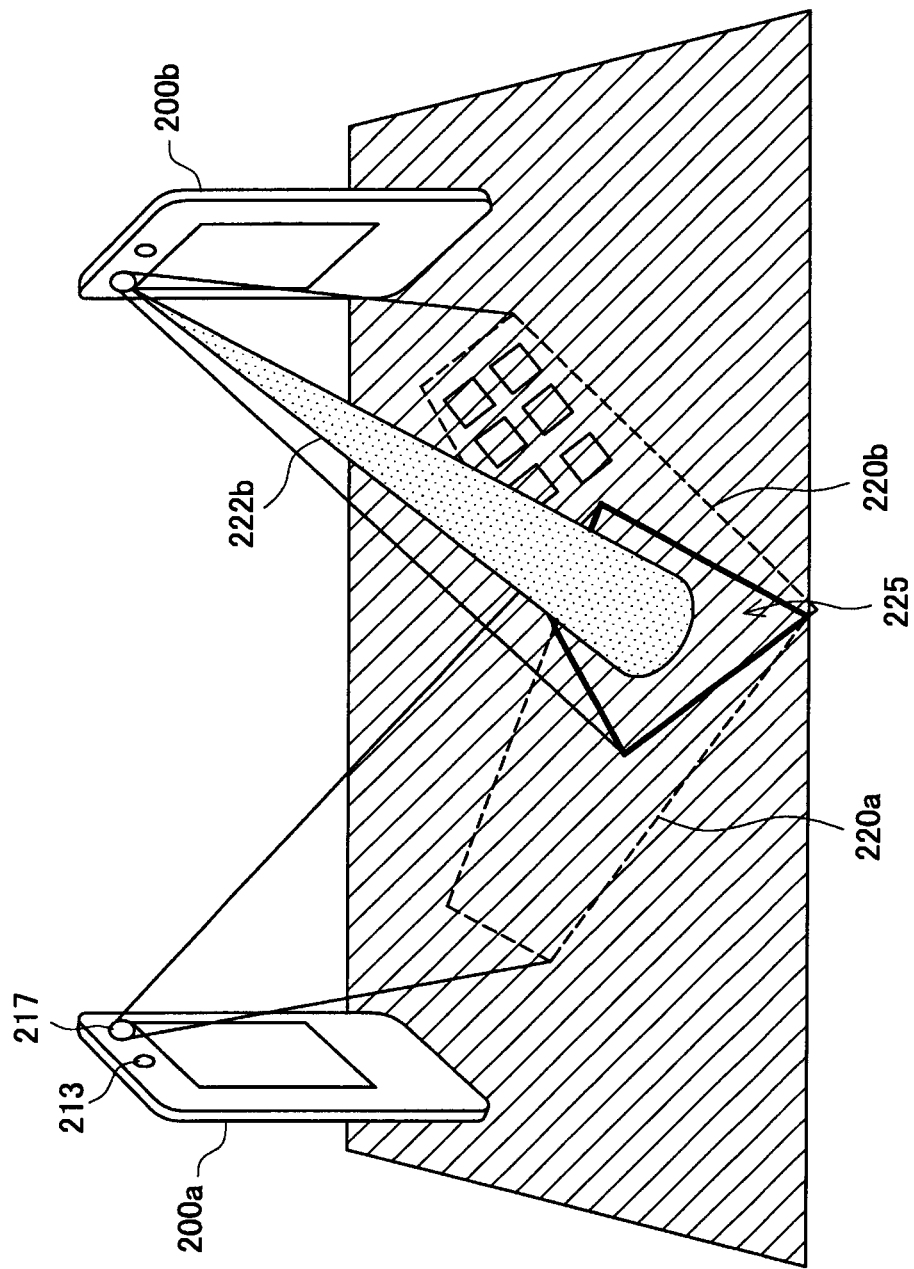
FIG. 18 is an explanatory diagram illustrating authentication between devices according to the embodiment.

However, in the case where the projection area is not uniform, for example, there is a risk that the mobile devices 200 spontaneously enter the authentication mode, and there is also a risk that the mobile device 200 may be authenticated as another device which is accidentally similar thereto. Consequently, in order to prevent such false recognition, in the case where it is determined that the image of the projection area is different from the projection image, it is preferred that an authentication signal 222b for authentication confirmation be projected on entire projection area or the common region 225 representing the overlapping part for the sake of confirmation as shown in FIG. 18. For example, when the mobile device 200b projects the authentication signal 222b for confirmation, the mobile device 200a detects the authentication signal 222b and projects an authentication signal on the same region as that on which the authentication signal 222b is projected. According to such a configuration, the region in which the projection areas are overlapped with each other can be confirmed, and the accuracy of authentication can be enhanced. Alternatively, with direct exchange of specific numbers by such projection of the authentication signals, an authentication relationship can be established.

Information can be exchanged via communication between the authenticated mobile devices 200, and hence, the following operation can be performed, for example.

Figure 19:
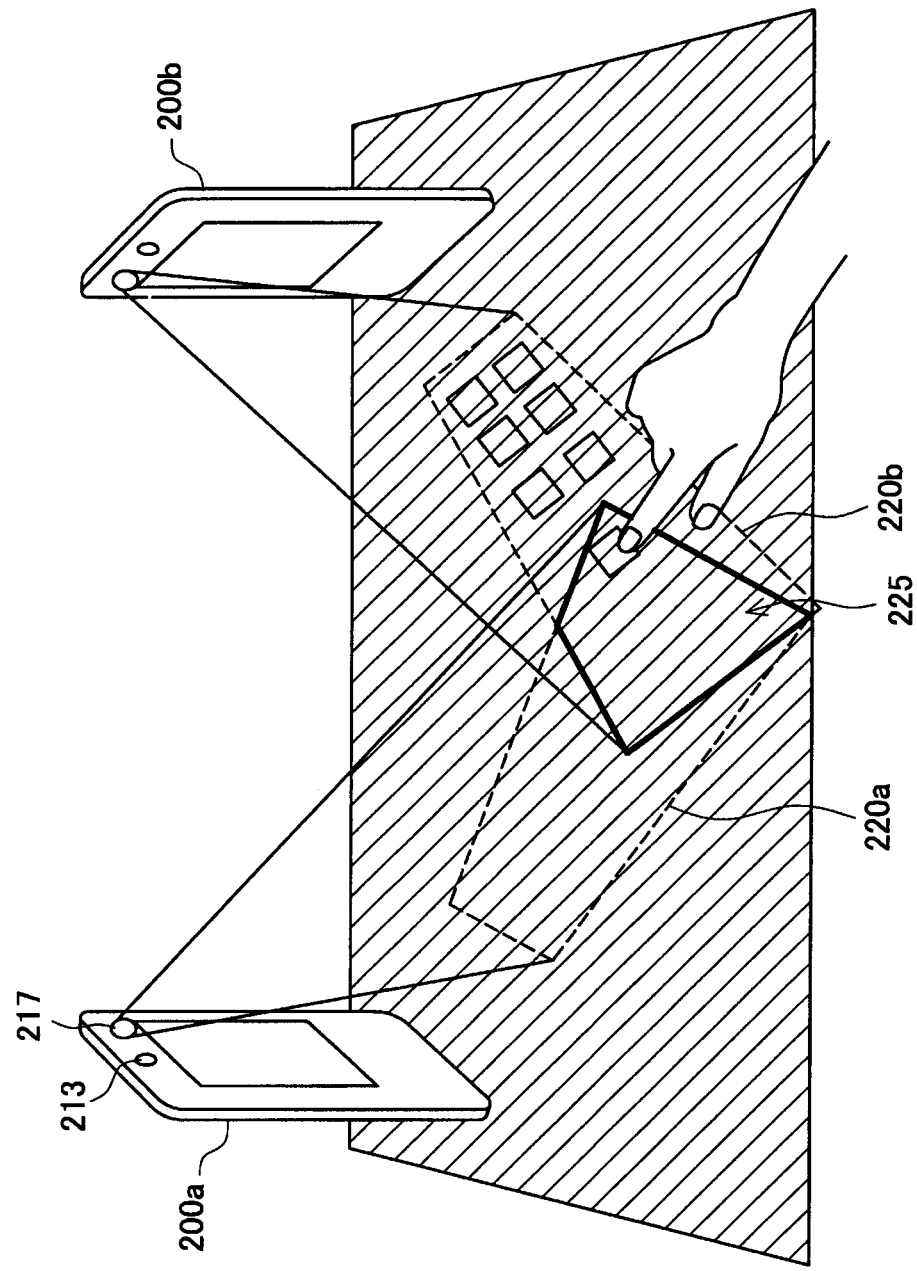
FIG. 19 is an explanatory diagram illustrating an example of a service which can be realized by the information processing system according to the embodiment.

For example, by handling the common region 225, which is a region in which the projection areas are overlapped with each other, as a temporary region to be shared, exchange of files can be performed. In this case, in order to clarify the common region, in the authentication process described above, the mobile device 200a and the mobile device 200b may each project a projection image which includes a frame around the region that is recognized to be the common region 225. For example, as shown in FIG. 19, an icon representing data stored in a local folder of the mobile device 200b, which is projected on the projection area 220b excluding the common region 225, is operated by a finger and is transferred to the common region 225, and by doing so, the mobile device 200a acquires from the mobile device 200b the data associated with the transferred icon.

3. Summary

As described above, according to the information processing system of one embodiment of the present disclosure, the authentication process between the plurality of devices can be performed only by activating an application and placing the mobile devices on a predetermined projection region, or by simply placing the mobile devices on a predetermined projection region. In that case, since a front projector is used, there can be provided intuitive authentication using an inexpensive apparatus.

Further, display information of the display screen of another apparatus is also acquired by the imaging section in parallel, and hence, there can be recognized the position, the size, the angle, the overlapping of screens of the display of the apparatus placed within the projection region. Accordingly, it becomes possible to perform more intuitive interaction using the position and the overlapping of the screens, and therefore, an operation which has been difficult and complicated in the past can be easily and intuitively performed.

It should be understood by those skilled in the art that various modifications, combinations, sub-combinations and alterations may occur depending on design requirements and other factors insofar as they are within the scope of the appended claims or the equivalents thereof.

For example, although the projection region is identical to the imaging region in the embodiments described above, the present disclosure is not limited to such an example. For example, the imaging region is a region including at least the projection region, and may be a region obtained by imaging a region larger than the projection region. In this case, the movement of a mobile device placed outside the projection region can also be detected.

Further, although the projection apparatus is a front projector in the embodiments described above, the present disclosure is not limited to such an example. The projection apparatus may be a rear projector, or, the front projector and the rear projector may be connected to the fixed projector control apparatus, and both the projection apparatuses may be used in accordance with the purpose of use.

Further, although the fixed projector control apparatus is a separate apparatus from the projection apparatus and the imaging apparatus in the embodiments described above, the present disclosure is not limited to such an example. For example, the projection apparatus may be provided as a projection section which is built in the fixed projector control apparatus. Further, in the same manner, the imaging apparatus may be provided as an imaging section which is built in the fixed projector control apparatus. Note that the fixed projector control apparatus may not necessarily be a fixed apparatus, and may be provided as a mobile terminal having the similar function.

Further, although there has been described giving the mobile phone as a mobile terminal as an example of the second information processing apparatus in the embodiments described above, the present disclosure is not limited to such an example. The second information processing apparatus may be an information processing apparatus such as a PC (Personal Computer), a video processing apparatus for home use (such as a DVD recorder and a video cassette recorder), a PDA (Personal Digital Assistants), a game device for home use, and a consumer electronics device. Further, the second information processing apparatus may also be a mobile phone, a PHS (Personal Handyphone System), a portable music reproduction device, a portable video processing device, and a portable game device.

Further, although there has been described mainly giving photograph content as the data to be exchanged between the devices in the embodiments described above, the present disclosure is not limited to such an example. The data to be exchanged may be content as a concept, including music data such as music, a lecture, and a radio program, video data such as a film, a television program, a video program, a photograph, a document, a picture, and a chart, a game, and software.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps are processed in the chronological order, the order of the steps may be changed appropriately according to circumstances.

The present disclosure contains subject matter related to that disclosed in Japanese Priority Patent Application JP 2010-209339 filed in the Japan Patent Office on Sep. 17, 2010, the entire content of which is hereby incorporated by reference.

What is claimed is:

1. An information processing apparatus comprising:
    a projection control section configured to control projection of a projection image containing first information for authentication associated with the information processing apparatus onto a second information processing apparatus placed within a projection region;
    an authentication control section configured to control an authentication process with the second information processing apparatus using second information for authentication associated with the second information processing apparatus detected based on a picked-up image of the projection region; and
    a communication control section configured to control communication with a second information processing apparatus authenticated by the authentication control section.

2. The information processing apparatus according to claim 1, wherein the projection control section causes a projection image containing a light-emission pattern associated with the first information for authentication to be projected.

3. The information processing apparatus according to claim 2, further comprising
    a detection section configured to detect the second information for authentication from an image for authentication displayed on a display screen of the second information processing apparatus, the image for authentication being included in the picked-up image.

4. The information processing apparatus according to claim 1, wherein,
    when it is detected that the second information processing apparatus is placed within the projection region, the projection control section causes the projection image containing the first information for authentication to be projected.

5. The information processing apparatus according to claim 1, wherein,
    when the second information for authentication is detected, the projection control section causes the projection image containing the first information for authentication to be projected.

6. The information processing apparatus according to claim 1, further comprising
    a storage section configured to store content,
        wherein the projection control section causes a projection image containing an object image associated with content stored in the storage section to be projected, and
        wherein, when the second information processing apparatus on the object image is detected, the communication control section causes content associated with the object image to be transmitted to the second information processing apparatus on the object image.

7. The information processing apparatus according to claim 1, further comprising
    a detection section configured to detect a change in a distance between an imaging apparatus which captures the picked-up image and the second information processing apparatus, based on the picked-up image.

8. The information processing apparatus according to claim 7,
    wherein the object image is associated with a plurality of pieces of content, and
    wherein the communication control section causes content selected based on the distance between the imaging apparatus and the second information processing apparatus, which is detected by the detection section, to be transmitted to the second information processing apparatus.

9. The information processing apparatus according to claim 8,
    wherein the detection section detects the change in the distance based on a change in a size of a predetermined part of the second information processing apparatus in the picked-up image.

10. The information processing apparatus according to claim 1, further comprising
    a detection section configured to detect an orientation of the second information processing apparatus based on the picked-up image.

11. The information processing apparatus according to claim 10,
    wherein the detection section detects, based on the change in the orientation of second information processing apparatus, a rotation operation of the second information processing apparatus, and
    wherein, when the rotation operation of the second information processing apparatus on an object image within a projection image is detected, the projection control section causes a position of the object image to be changed based on a position of the second information processing apparatus in which the rotation operation is detected.

12. The information processing apparatus according to claim 10,
    wherein the detection section detects the orientation of the second information processing apparatus further based on learning data related to an external appearance of the second information processing apparatus.

13. The information processing apparatus according to claim 10,
    wherein the detection section detects a symbol from a part of the second information processing apparatus within the picked-up image, and detects the orientation of the second information processing apparatus based on an orientation of the symbol.

14. The information processing apparatus according to claim 1, further comprising
    a detection section configured to detect a position of the second information processing apparatus based on the picked-up image, wherein the communication control section causes content displayed on a display section of the authenticated second information processing apparatus to be acquired, and wherein the projection control section controls projection of a projection image containing an object image indicating that the acquired content at a position at which the second information processing apparatus is detected.

15. The information processing apparatus according to claim 2,
    wherein the projection control section selects a light-emission pattern to be used for authentication from among a plurality of kinds of the light-emission patterns, and, when there are a plurality of information processing apparatuses within the projection regions, causes light-emission patterns which are different from each other to be projected onto respective information processing apparatuses.

16. The information processing apparatus according to claim 1,
wherein, when, after the second information processing apparatus was detected, the second information processing apparatus becomes undetected within the projection region, the communication control section cuts off communication with the second information processing apparatus.

17. The information processing apparatus according to claim 1,
wherein the projection control section controls projection of a projection image containing an authenticated image indicating that authentication of the second information processing apparatus authenticated by the authentication control section is completed.

18. An information processing system comprising:
a first information processing apparatus which controls a projection section; and
a second information processing apparatus which is placed within a projection region of the projection section,
wherein the first information processing apparatus includes
a projection control section configured to control projection of a projection image containing first information for authentication associated with the first information processing apparatus onto the second information processing apparatus,
an authentication control section configured to control an authentication process with the second information processing apparatus using second information for authentication associated with the second information processing apparatus detected based on a picked-up image of the projection region, and
a communication control section configured to control communication with the second information processing apparatus authenticated by the authentication control section, and
wherein the second information processing apparatus includes
an imaging section configured to acquire the projection image,
an authentication control section configured to control an authentication process with the first information processing apparatus using the first information for authentication detected from the projection image, and
a communication control section configured to control communication with the authenticated first information processing apparatus.

19. An information processing method for a first information processing apparatus comprising:
detecting a second information processing apparatus placed within a projection region;
projecting a projection image containing first information for authentication associated with the first information processing apparatus onto the second information processing apparatus;
detecting second information for authentication associated with the second information processing apparatus based on a picked-up image of the projection region;
performing an authentication process with the second information processing apparatus using the detected second information for authentication; and
starting communication with the authenticated second information processing apparatus.

20. A non-transitory computer-readable medium for causing a computer to function as an information processing apparatus which includes
a projection control section configured to control projection of a projection image containing first information for authentication associated with the first information processing apparatus onto a second information processing apparatus placed within a projection region,
an authentication control section configured to control an authentication process with the second information processing apparatus using second information for authentication associated with the second information processing apparatus detected based on a picked-up image of the projection region, and
a communication control section configured to control communication with a second information processing apparatus authenticated by the authentication control section.

* * * * *